United States Patent
Veenstra et al.

(10) Patent No.: US 11,558,755 B2
(45) Date of Patent: Jan. 17, 2023

(54) APPARATUS AND METHOD FOR EFFICIENT DEPLOYMENT OF NODES IN A NETWORK

(71) Applicant: The Regents of the University of California, Oakland, CA (US)

(72) Inventors: Kerry Veenstra, Santa Cruz, CA (US); Katia Obraczka, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 57 days.

(21) Appl. No.: 17/324,834

(22) Filed: May 19, 2021

(65) Prior Publication Data
US 2021/0368356 A1 Nov. 25, 2021

Related U.S. Application Data

(60) Provisional application No. 63/026,779, filed on May 19, 2020.

(51) Int. Cl.
*H04W 16/18* (2009.01)
*H04W 4/02* (2018.01)
*G08B 25/10* (2006.01)
*H04W 4/38* (2018.01)

(52) U.S. Cl.
CPC ............ *H04W 16/18* (2013.01); *G08B 25/10* (2013.01); *H04W 4/023* (2013.01); *H04W 4/38* (2018.02)

(58) Field of Classification Search
None
See application file for complete search history.

(56) References Cited

U.S. PATENT DOCUMENTS

| 6,115,580 | A | * | 9/2000 | Chuprun | H04W 4/021 455/1 |
| 8,447,330 | B2 | * | 5/2013 | Chakravarty | G01S 11/06 455/456.1 |
| 2016/0302083 | A1 | * | 10/2016 | Durick | H04W 24/02 |
| 2016/0316377 | A1 | * | 10/2016 | Hooey | H04L 41/12 |

* cited by examiner

*Primary Examiner* — Thomas S McCormack
(74) *Attorney, Agent, or Firm* — Wolter Van Dyke Davis, PLLC; Eugene J. Molinelli; Cian O'Brien

(57) ABSTRACT

A method and apparatus for efficient deployment of nodes in a network includes obtaining first data that indicates first locations of nodes in a network and terrain data that indicates height of terrain at terrain locations. The method further includes determining an exploration region for a first node and dividing the exploration region into subregions. The method further includes determining a proxy location for each subregion that is a location corresponding to a characteristic of the terrain data in the subregion. The method further includes determining a value of a parameter that indicates a contribution of the first node at each proxy location to network fitness. The method further includes assigning a second location to the first node based on the determined parameter value at each proxy location. The method further includes relocating the first node from the first location to the second location.

20 Claims, 19 Drawing Sheets

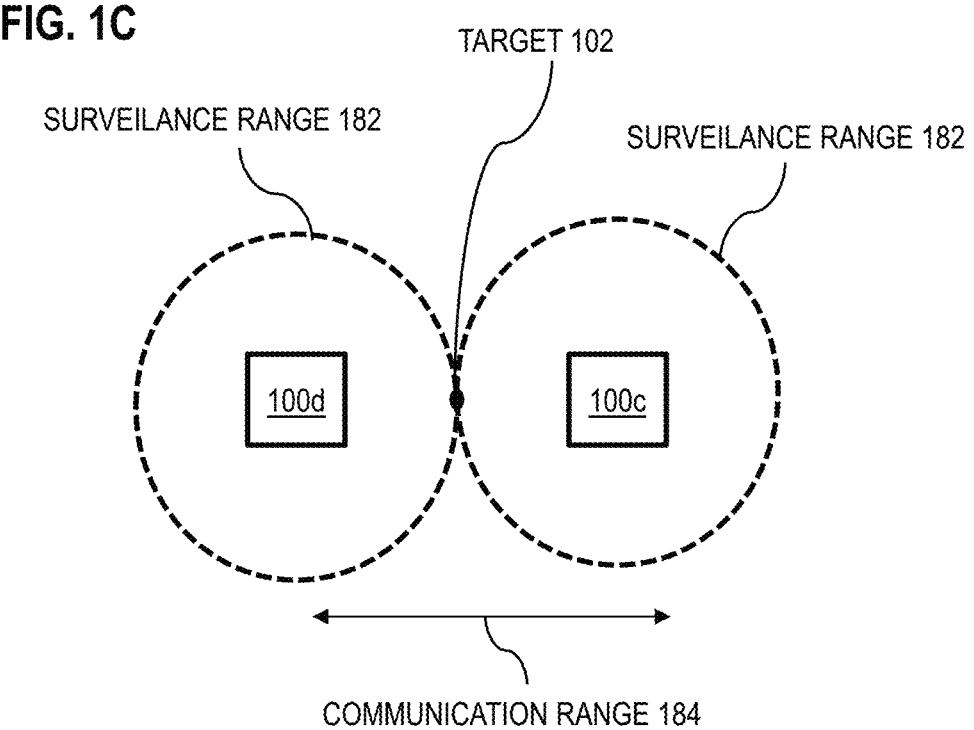
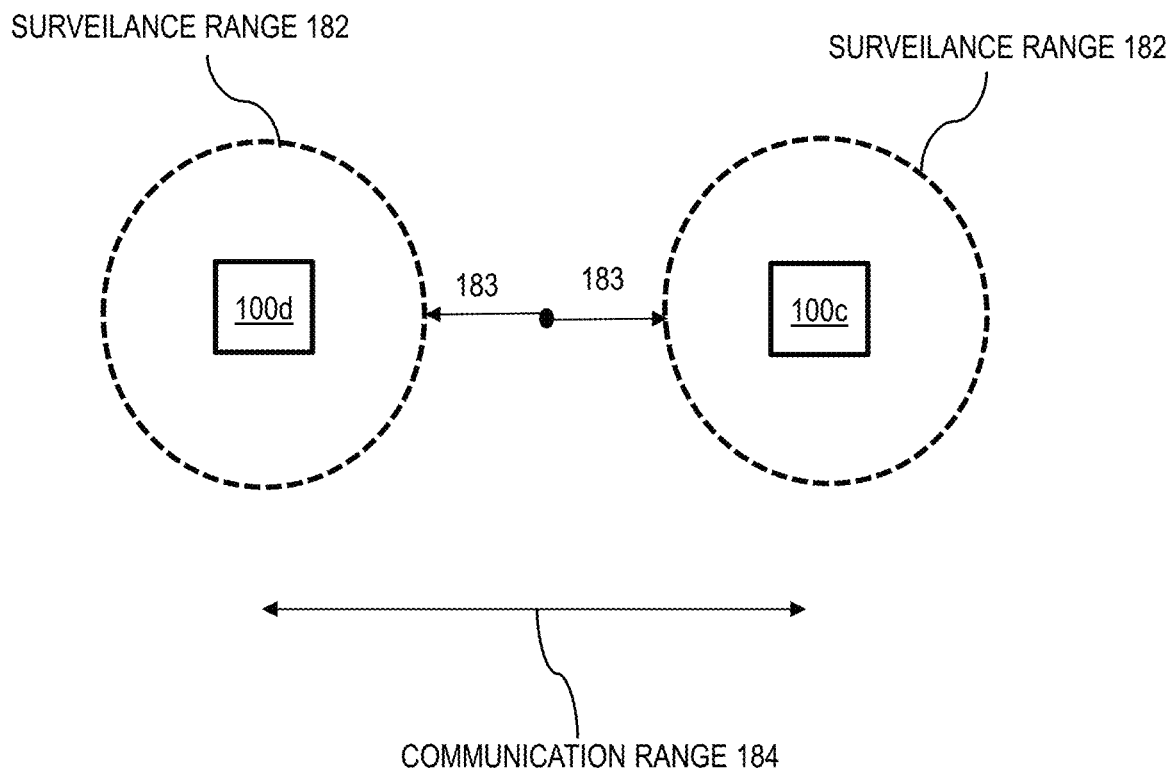

APPARATUS AND METHOD FOR EFFICIENT DEPLOYMENT OF NODES IN A NETWORK

CROSS-REFERENCE TO RELATED APPLICATIONS

This application claims benefit of Provisional Appln. 63/026,779, filed May 19, 2020, the entire contents of which are hereby incorporated by reference as if fully set forth herein, under 35 U.S.C. § 119(e).

STATEMENT OF GOVERNMENTAL INTEREST

This invention was made with government support under Grant No. CNS 1321151 awarded by the National Science Foundation. The government has certain rights in the invention.

BACKGROUND

Outdoor camera networks, e.g., wireless camera networks for outdoor deployment, have a wide range of applications, including surveillance of outdoor areas, environmental monitoring, and event tracking. Deployment of camera nodes (that is, choosing their positions) on the surface of a two dimensional (2D) plane has been well researched, using line of sight (LOS) between cameras and targets to determine camera/target visibility. Less is known about deployment in three dimensional (3D) regions, where nodes are constrained to the surface of terrain, and landforms might block the cameras' LOS views.

SUMMARY

Techniques are provided for a method and apparatus for efficient deployment of nodes in a network that optimizes the coverage of the network. It is here recognized that conventional methods for node deployment in a network are computationally inefficient. When evaluating whether to deploy a node in a particular region with multiple node candidate locations, the conventional method computes network fitness of the deployed node at each of the multiple node candidate locations. The inventors developed an improved method where a proxy location for the region is first determined after which the network fitness is only computed based on node placement at the proxy location.

Additionally, when computing the network fitness using each of the multiple node candidate locations, the conventional method factors in every network node in the computations. It is here recognized this step is also computationally inefficient and developed the improved method so that the network fitness computation only needs to factor in nearby nodes to the node candidate location.

In a first set of embodiments, a method is provided for efficient deployment of nodes in a node network. The method includes obtaining, on a processor, first data that indicates a plurality of first locations of a respective plurality of nodes in a network over a terrain and terrain data that indicates height of terrain at a plurality of terrain locations in an area under surveillance. The method further includes determining, on the processor, an exploration region for a first node of the plurality of nodes. The method further includes dividing, on the processor, the exploration region into a plurality of subregions. The method further includes determining, on the processor, a proxy location for each subregion of the exploration region. The proxy location is a location corresponding to a characteristic of the terrain data within the respective subregion. The method further includes determining, on the processor, a value of a parameter that indicates a contribution of the first node at each proxy location to network fitness of the plurality of nodes based on the terrain data. The method further includes assigning, with the processor, a second location to the first node based on the determined value of the parameter at each proxy location. The method further includes relocating the first node from the first location to the second location.

In a second set of embodiments, a non-transitory computer-readable medium is provided for causing a processor to perform one or more steps of the method of the first set of embodiments.

In a third set of embodiments, a surveillance node is provided. The surveillance node includes a surveillance sensor configured to sense objects within a surveillance range of the surveillance node. The surveillance node also includes an antenna configured to transmit and receive signals within a communication range of the surveillance node. The surveillance node further includes a mobility component configured to facilitate movement of the surveillance node over a terrain. The surveillance node further includes a support to couple the mobility component with the surveillance sensor and the antenna. The surveillance node further includes a processor and a memory including a sequence of instructions. The memory and the sequence of instructions are configured to, with the processor, cause the surveillance node to perform one or more steps of the method of the first set of embodiments.

In a fourth set of embodiments, a surveillance network is provided that includes a plurality of surveillance nodes of the third set of embodiments.

In a fifth set of embodiments, a method is provided for efficient deployment of nodes in a node network that includes one or more steps of the method of the first set of embodiments.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1C is a block diagram that illustrates an example surveillance network in which surveillance nodes are spaced apart based on the surveillance range, according to an embodiment;

FIG. 1D is a block diagram that illustrates an example surveillance network in which surveillance nodes are spaced apart based on the surveillance range and exploration radius, according to an embodiment;

DETAILED DESCRIPTION

A method and apparatus are described for efficient deployment of nodes in a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of deployment of nodes in a network, such as deployment of nodes in an outdoor mobile internet of things (IoT) network. In other embodiments, the invention is described below in the context of outdoor camera IoT networks (e.g. wireless camera networks for outdoor deployment) used in various applications such as surveillance of outdoor areas, environmental monitoring and event tracking. However, the invention is not limited to this context. In other embodiments, the invention is described in other contexts such as sound sensing, ultrasonic ranging and radio sensing.

1. OVERVIEW

Figure 1A:
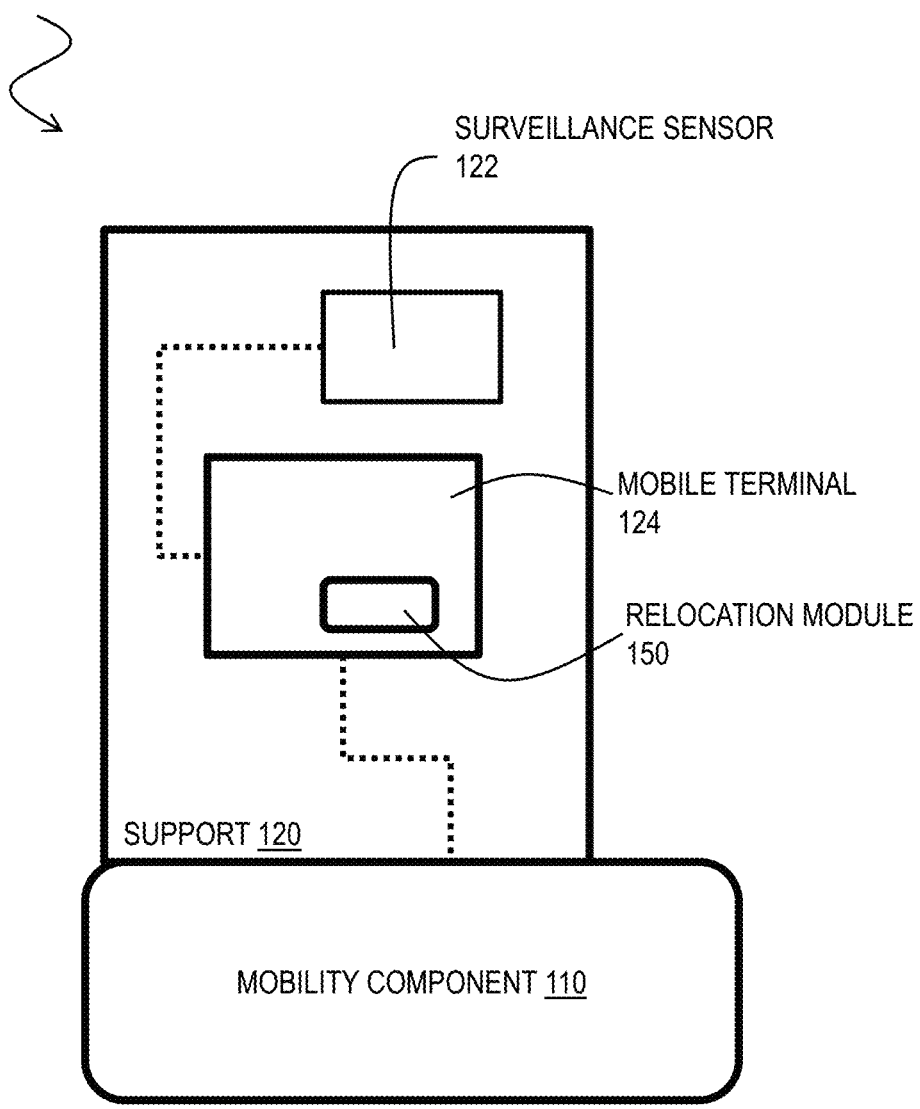
FIG. 1A is a block diagram that illustrates an example surveillance node to be deployed in a surveillance node network, according to an embodiment.

FIG. 1A is a block diagram that illustrates an example surveillance node 100 to be deployed in a surveillance node network, according to an embodiment. In the illustrated embodiment, the surveillance node 100 includes a support 120, a mobility component 110 attached to the support, a surveillance sensor 122 attached to the support 120 and a communications system mobile terminal 124 attached to the support. The mobile terminal is configured with a relocation module 150 as described in greater detail hereinafter.

In an embodiment, the mobility component 110 is configured to facilitate movement of the surveillance node 100 (e.g. between two locations of terrain within an area under surveillance). In one embodiment, the mobility component 110 includes wheels, treads, flight propellers or any known means for facilitating movement of the surveillance node 100 over terrain, as appreciated by one of ordinary skill in the art. In one example embodiment, the mobility component 110 includes a means for propulsion (e.g. motor, engine, propeller, etc.) to move the surveillance node 100 over the terrain. In this example embodiment, upon receiving a signal from the mobile terminal 124 (e.g. that indicates a second terrain location to move the surveillance node 100), the mobility component 110 automatically moves the surveillance node 100 from the first terrain location to the second terrain location. In other embodiments, the mobility component 110 excludes a means for propulsion and the surveillance node 100 is moved by human means for propulsion (e.g. a user pushes on the surveillance node 100 such as by holding a handle on the surveillance node 100) or an external means for propulsion (e.g. a user pulls or carries the surveillance node 100 with a vehicle, etc.). In some embodiments, the surveillance node 100 includes a location sensor (e.g. Global Positioning System or GPS) and routing software to facilitate location or movement of the surveillance node 100 from the first terrain location to the second terrain location. In an example embodiment, the mobile terminal 124 sends and receives signals from the location sensor and upon receiving a signal from the location sensor that the surveillance node 100 is at the second terrain location, the mobile terminal 124 transmits a signal to the mobile component 110 to cease movement of the surveillance node 100.

In an embodiment, the surveillance sensor 122 is configured to sense targets 102 (FIG. 1B) within a surveillance range 182 (FIG. 1B) of the surveillance node 100. In some embodiments, the surveillance sensor 122 is a camera that captures radiation from targets 102 within the surveillance range 182 of the surveillance node 100. In an example embodiment, the surveillance sensor 122 is a visual camera that captures radiation in the human visible spectrum (e.g. with a wavelength in a range from about 400 nanometers to about 700 nanometers). In another example embodiment, the surveillance sensor 122 is any optical camera other than a visual camera, including an infrared (IR) camera or an ultraviolet (UV) camera that captures radiation in the infrared and ultraviolet spectrum, respectively. In other embodiments, the surveillance sensor 122 includes a transmitter and a detector that are configured to transmit a first signal over the surveillance range 182 and detect a second signal based on the first signal being reflected from a target 102 within the surveillance range 182. In an example embodiment, the surveillance sensor 122 includes a laser (e.g. employing light detection and ranging or LIDAR) to transmit a first laser signal and a sensor to detect a second laser signal based on the first laser signal reflected from the object within the surveillance range 182.

Figure 7:
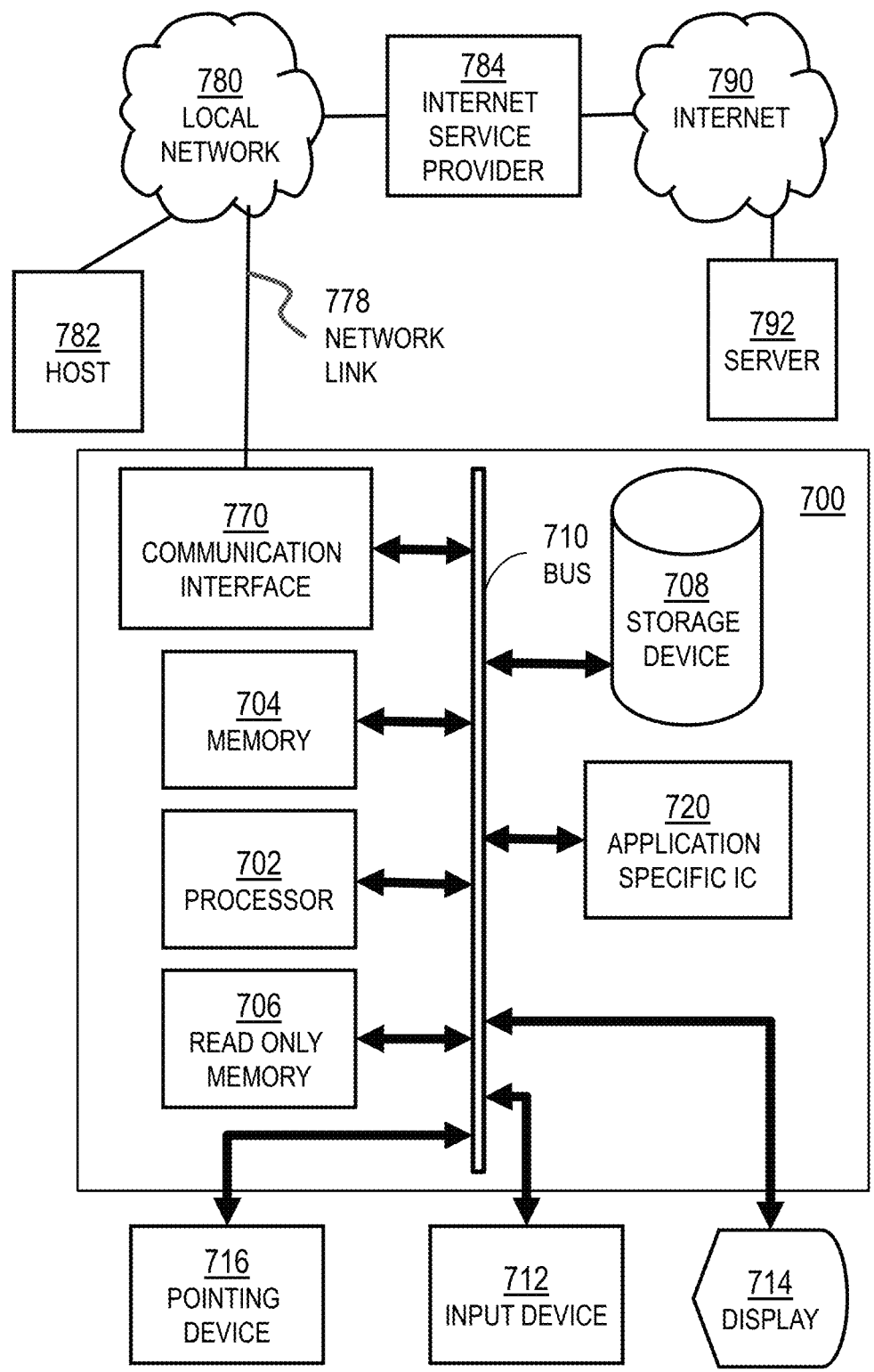
FIG. 7 is a block diagram that illustrates an example computer system upon which an embodiment of the invention may be implemented.
Figure 8:
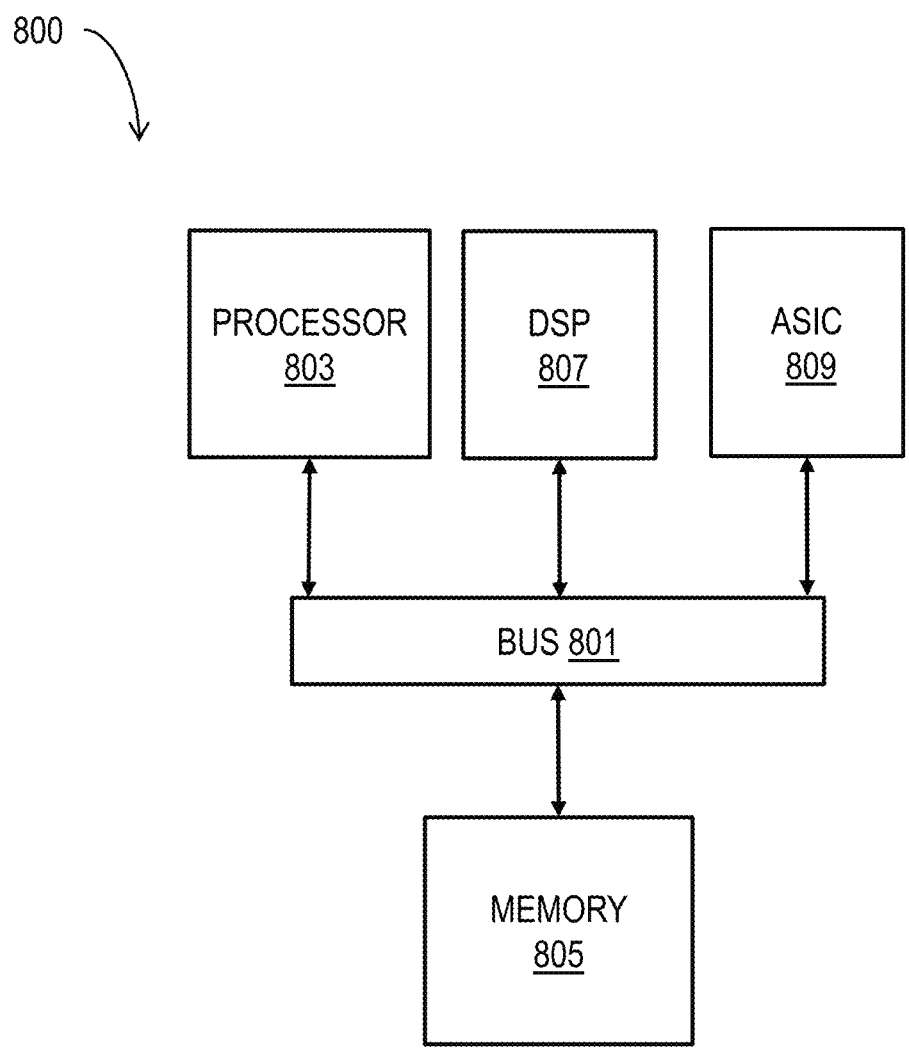
FIG. 8 is a block diagram that illustrates an example chip set upon which an embodiment of the invention may be implemented.
Figure 9:
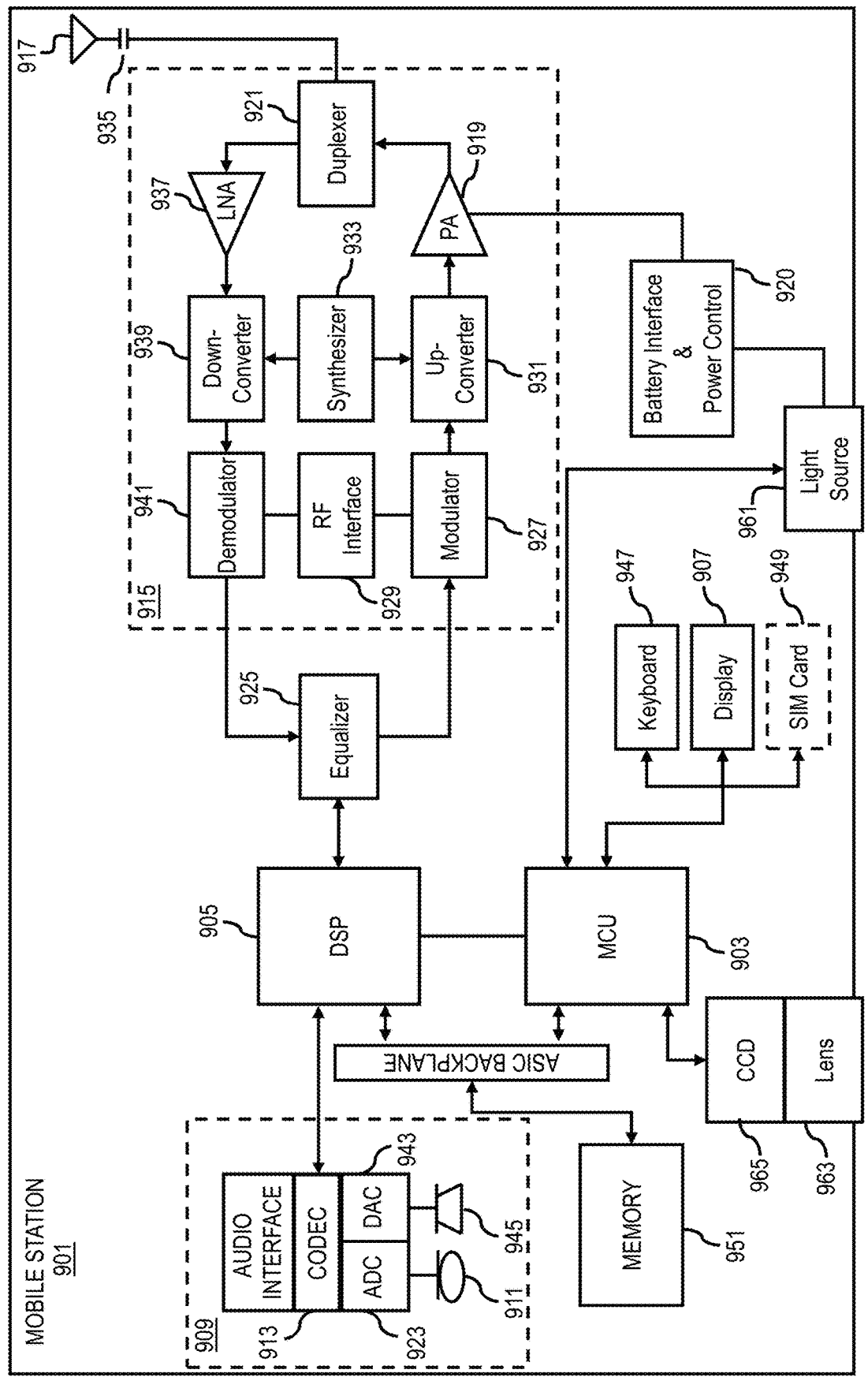
FIG. 9 is a block diagram that illustrates a mobile terminal upon which an embodiment of the invention may be implemented.

In an embodiment, the mobile terminal 124 is provided to control operation of the surveillance node 100 (e.g. operation of the surveillance sensor 122 and/or the mobility component 110). In an embodiment, the mobile terminal 124 comprises the mobile station 901 of FIG. 9 that includes a processor such as the main control unit (MCU) 903 to facilitate communication with one or more components of the surveillance node 100 and that performs one or more steps of the methods discussed herein. In one embodiment, the mobile terminal 124 receives signals that indicate data (e.g. imaging data) from the surveillance sensor 122, to determine a location of one or more targets 102 within the surveillance range 182 of the surveillance sensor 122. In another embodiment, the mobile terminal 124 transmits signals to the surveillance sensor 122 to control operation of the surveillance sensor 122 (e.g. activate the sensor, deactivate the sensor, etc.). The mobile terminal 124 includes a relocation module process 150 to perform one or more steps of a method described below with reference to FIGS. 3A and 3B. In various embodiments, the mobile terminal 124 comprises one or more general purpose computer systems or upgraded computer systems that include graphics processing units, as depicted in FIG. 7 or one or more chip sets as depicted in FIG. 8 or one or more mobile stations 901 as depicted in FIG. 9, and instructions to cause the computer or chip set or mobile station to perform one or more steps of a method described below with reference to FIGS. 3A and 3B.

In an embodiment, the mobile terminal 124 has an antenna (e.g. antenna 917 of the mobile station 901) that is configured to transmit and receive signals within a communication range 184 (FIG. 1B) of the surveillance node 100. In an example embodiment, the antenna is configured to transmit signals that indicate data (e.g. current location of the surveillance node 100, detected targets 102 within the surveillance range 182 of the surveillance node 100, etc.) to other nodes 100 within the communication range 184. In an example embodiment, the antenna is also configured to detect signals from other surveillance nodes 100 that indicate data (e.g. current location of the other surveillance nodes 100, detected targets within the surveillance range 182 of the other surveillance nodes 100, etc.). In various embodiments, any wired or wireless communication modes may be used, including any known communication optical or radio frequency channels or protocols. Wireless communications provide the advantage of longer communication ranges and unimpeded independent movement of the various nodes in the network.

In an embodiment, the surveillance node 100 includes the support 120 that mounts the surveillance sensor 122 and mobile terminal 124 to the mobility component 110. In an example embodiment, the surveillance node 100 is an unmanned ground vehicle (UGV) such as the Special Operations TALON® (SOTALON), manufactured by Foster-Miller (Waltham, Mass.).

Figure 1B:
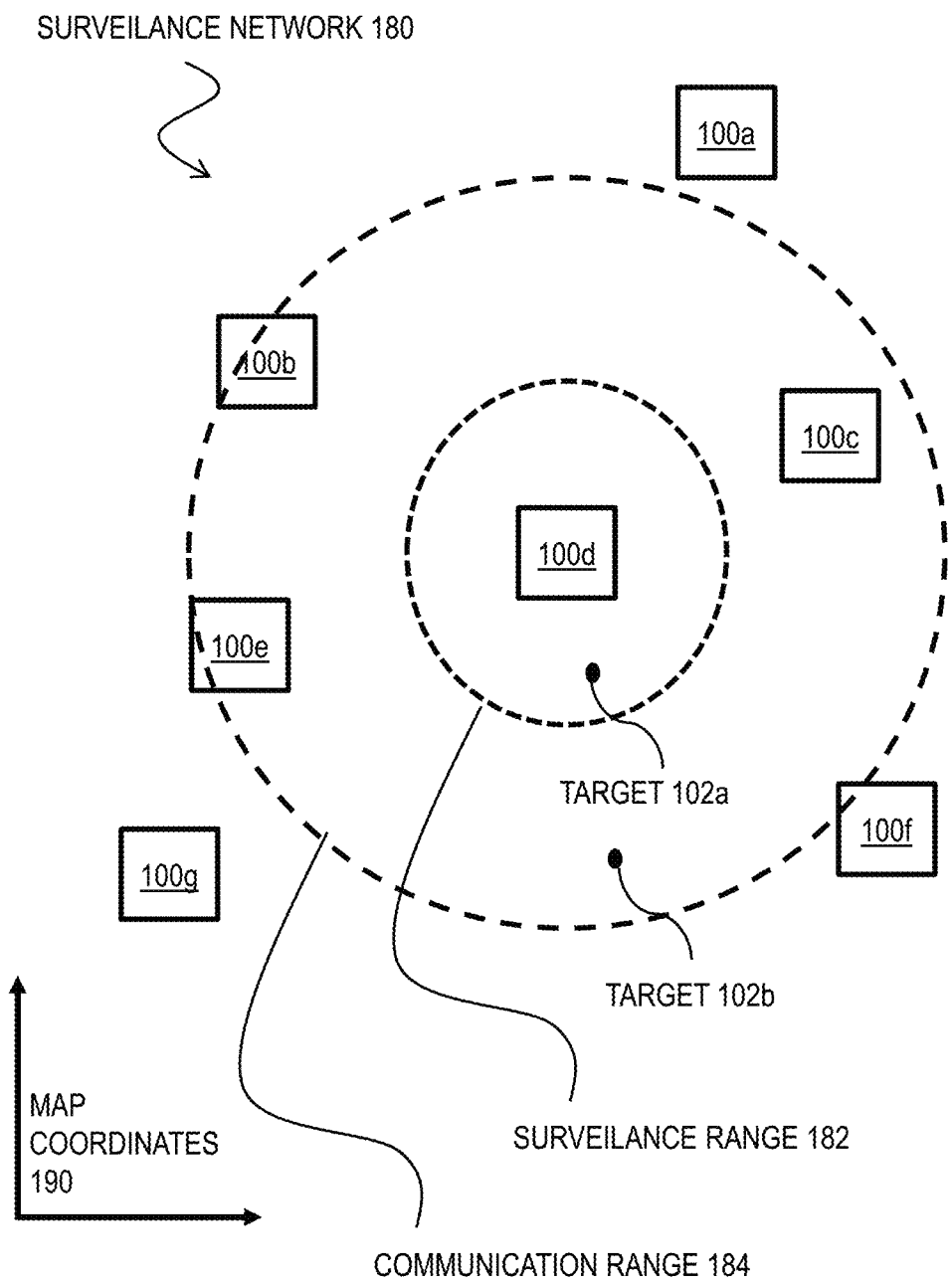
FIG. 1B is a block diagram that illustrates an example surveillance network in which the surveillance node of FIG. 1A is to be deployed, according to an embodiment.

FIG. 1B is a block diagram that illustrates an example surveillance network 180 in which the surveillance node 100*d* (similar to the surveillance node 100 of FIG. 1A) is to be deployed, according to an embodiment. In an embodiment, the surveillance network 180 includes surveillance node 100*a* through 100*g*. In an embodiment, the surveillance network 180 excludes the targets 102*a* and 102*b*. In an example embodiment, each surveillance node 100*a* through 100*g* is similar to the surveillance node 100 of FIG. 1A. Although seven surveillance nodes are depicted in the surveillance network 180, the surveillance network 180 is not limited to any particular number of surveillance nodes and can include less or more than depicted in FIG. 1B. Additionally, the surveillance range 182 and communication range 184 are depicted for the surveillance node 100*d*, however the remaining surveillance nodes have a surveillance range and communication range that may be the same or different than the surveillance node 100*d*. In an example embodiment, a first target 102*a* is within the surveillance range 182 of the surveillance node 100*d* and thus can be detected by the surveillance node 100*d*, if no intervening terrain obstructs the view, whereas a second target 102*b* is outside the surveillance range 182 of the surveillance node 100*d* and thus cannot be detected by the surveillance node 100*d*, even if no intervening terrain obstructs the view. However, the second target 102*b* can be detected by the surveillance network 180 provided it is within the surveillance range 182 of any of the surveillance nodes 100*a* through 100*g*. Surveillance range reflects both the effects of attenuation of the detected signal propagating between target and sensor, and the resolution limits of the sensor that prevent detecting a target smaller than a certain size beyond a certain distance, among other limits to detection.

In an embodiment, the method discussed herein is used to deploy a surveillance node (e.g. surveillance node 100*d*) in a surveillance network (e.g. surveillance network 180). In an embodiment, the method is configured to maximize coverage of the surveillance network 180. For purposes of this description "coverage" is a measure of a number of visible target 102 positions (e.g., positions at which an event can be detected by the surveillance network 180). A target 102 is covered if one or more surveillance nodes 100a through 100g (e.g. cameras) of the surveillance network 180 can detect the target 102 with an unobstructed line-of-sight (LOS) view. For purposes of this description, "visibility" or a "visible" target 102 means there is an unobstructed LOS between a surveillance node 100 of the network 180 and the target 102.

In addition to LOS, the surveillance range 182 of the surveillance node 100 can also be considered in determining network coverage. As appreciated by one of ordinary skill in the art, visual target resolution of the surveillance sensor 122 becomes limited as the distance from the surveillance node 100 to a target 102 increases. Thus, a maximum node-to-target distance is limited to the surveillance range 182 of the surveillance node 100. Combining visibility (unobstructed LOS view) and surveillance range 182 leads to the concept of range-limited visibility. For purposes of this description, "range-limited visibility" means there is an unobstructed LOS between at least one surveillance node 100 of the network 180 and the target 102 and the target 102 is within the surveillance range 182 of the surveillance node 100. Additionally, for purposes of this description, "cumulative range-limited visibility" means the number of targets 102 for which there is an unobstructed LOS between a surveillance node 100 and the target 102 and where the target 102 is within the surveillance range 182 of at least one surveillance node 100 of the surveillance network 180. Range-limited visibility can thus be used to guide the deployment of surveillance nodes 100 in the surveillance network 180.

Additionally, for purposes of this invention, a "viewshed" is defined as a set of all positions at which a target 102a or 102b can be detected by the surveillance network 180 (or for a particular surveillance node 100 of the surveillance network 180). A common and frequent goal in visual sensor network deployments is to maximize the number of locations of targets 102 that comprise the viewshed. In the case of continuous terrain, a goal is to maximize the area of the viewshed. For purposes of this description, a "fitness" of the surveillance network 180 is based on the cumulative range-limited visibility. The cumulative range-limited visibility accounts for the constraint of maximum surveillance node-to-target range (e.g. less than or equal to the surveillance range 182).

In an embodiment, the method of deploying the surveillance node 100 in the surveillance network 180 is an optimization problem which aims to maximize some measure of network fitness by adjusting surveillance node 100 positions subject to practical constraints (e.g. the number of surveillance nodes 100). Often the measure of network fitness is some form of coverage, which measures the network's ability to perform its functions, e.g., survey the region, detect events, etc.

Figure 2A:
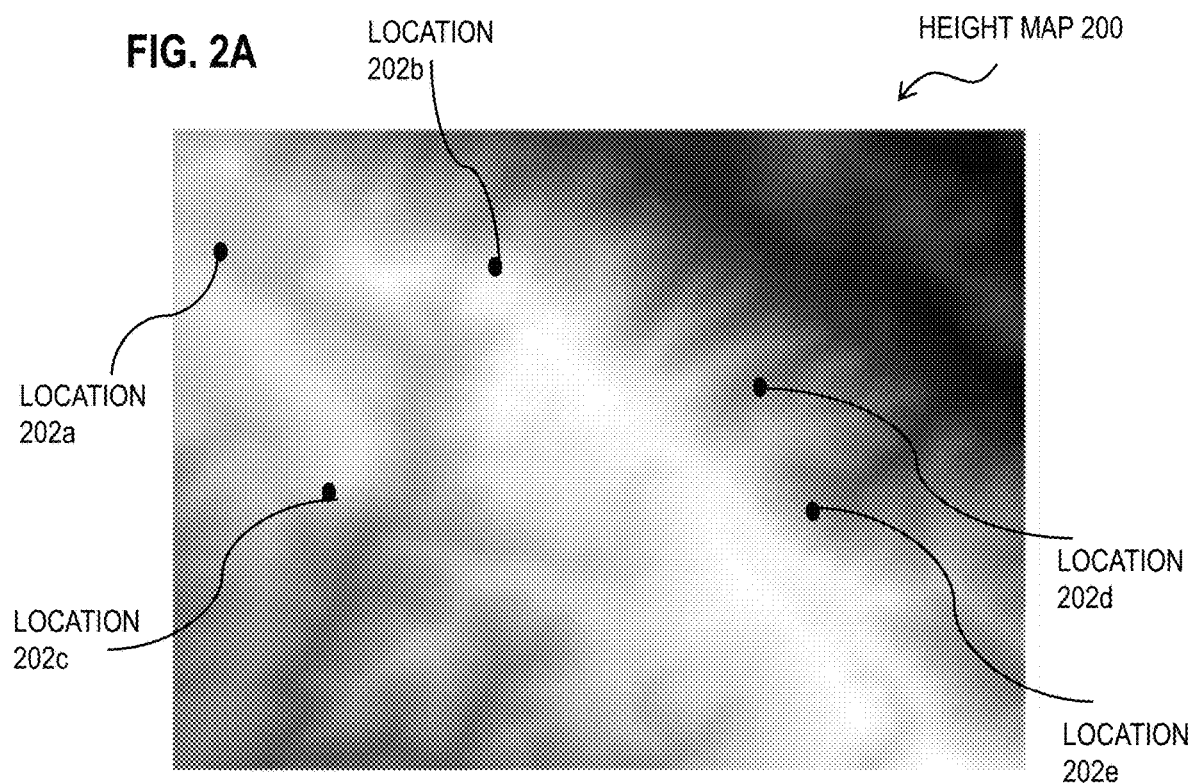
FIG. 2A is an image that illustrates an example of a plurality of terrain locations in a height map of an area under surveillance, according to an embodiment.

To illustrate the concept of cumulative visibility and range limited cumulative visibility, FIG. 2A is an image that illustrates an example of a plurality of locations 202 in terrain data presented as a height map 200 of an area under surveillance, according to an embodiment. The height map 200 is based on terrain data that provides height of terrain at each of a plurality of geographic positions. The height map 200 uses greyscale, in which bright regions of the height map 200 indicate terrain locations with greater elevation (e.g. peak, plateau, etc.) and dark regions of the height map 200 indicates terrain locations with lower elevation (e.g. valley, trough, hole, etc.). As shown in the height map 200, locations 202a through 202c have greater elevation whereas locations 202d and 202e have lower elevation. Ridges appear as bright linear regions while valleys appear as dark linear regions. When using a grid-based height map 200, a straightforward visibility algorithm treats each grid position as entirely visible or as entirely obstructed. As such, the range-limited cumulative visibility of a deployment is given by the total number of grid positions that have visibility from at least one of the surveillance nodes 100 of the surveillance network 180.

Figure 2B:
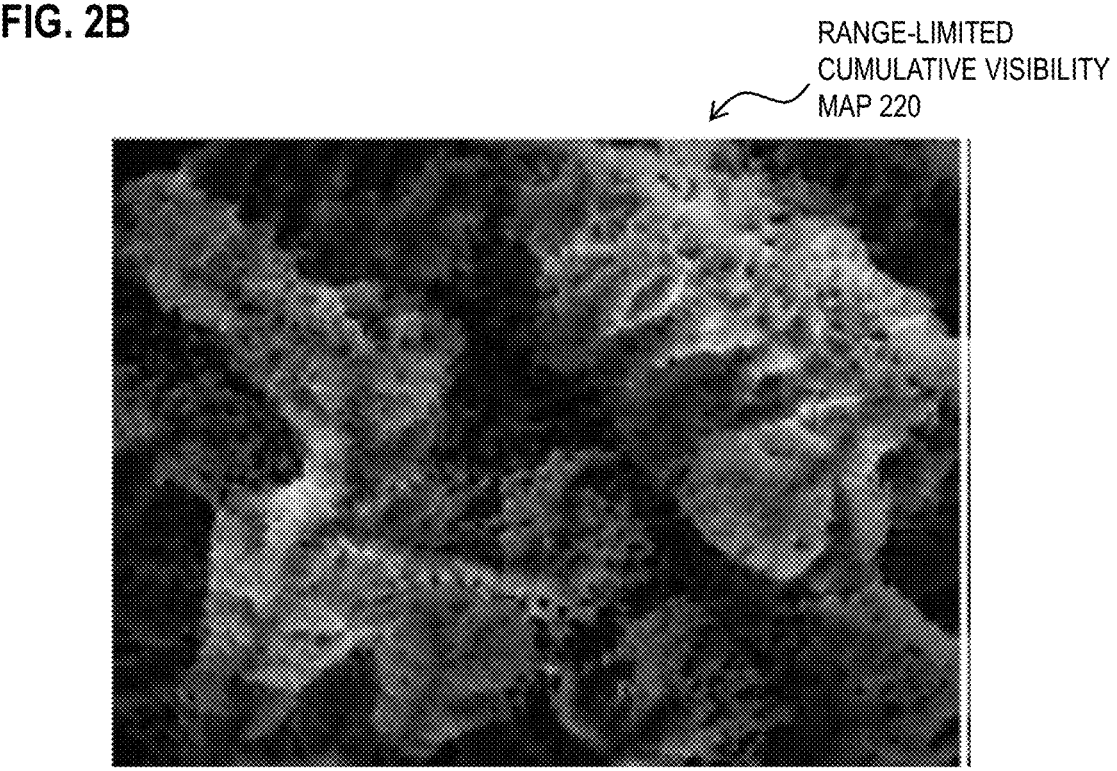
FIG. 2B is an image that illustrates an example of a range-limited cumulative visibility map of the area under surveillance in FIG. 2A, according to an embodiment.

FIG. 2B is an image that illustrates an example of a range-limited cumulative visibility map 220 of the area under surveillance in FIG. 2A, according to an embodiment. In the illustrated embodiment, the map 220 shows the range-limited cumulative visibility corresponding to the height map 200 of FIG. 2A. In the ranged-limited cumulative visibility map 220, bright regions indicate node locations that can see the greatest areas of the surrounding terrain. A comparison between a region of the height map 200 and the corresponding region of the ranged-limited cumulative visibility map 220 indicates which terrain elevations correspond to high (or low) values of the range-limited cumulative visibility.

In one example, the dark regions of the height map 200 of FIG. 2A (e.g. terrain locations 202d or 202e) correspond to bright regions of the ranged-limited cumulative visibility map 220. This comparison indicates that terrain locations with lower elevation (e.g. large valleys) correspond with high values of the range-limited cumulative visibility. In an example, the terrain locations 202d or 202e are along a valley wall with a concave-up shape and the high values of these locations in the map 220 indicate that terrain locations along a valley wall can see a large portion of terrain locations of the opposite valley wall. Additionally, terrain location 202a that is within a bright, central region of the height map 200 and indicates an area of greatest elevation corresponds to a dark region in the ranged-limited cumulative visibility map 220. This correspondence shows that higher node elevation does not necessarily lead to greater visibility. Thus, a surveillance node 100 that is located in the middle of a high plateau will be unable to see regions of the terrain below the plateau without first moving to an edge of the plateau. In addition, while distant mountains might be seen from positions anywhere on the plateau, the surveillance range 182 of the surveillance node 100 may prevent the surveillance node 100 from usefully resolving such distant targets, hurting visibility.

One advantage of the method disclosed herein is that when deploying the surveillance node 100 in the surveillance network 180, network fitness computations need not factor in the locations of all surveillance nodes 100a through 100g in the surveillance network 180. In order to design a method that relies only on knowledge of nearby surveillance nodes and their locations (instead of requiring global knowledge), the method introduces a parameter for computing the contribution that an individual surveillance node 100 position has on the fitness of the entire surveillance network 180. For purposes of this description, a Wonderful Life utility ("WLU") is a known algorithm that determines a contribution that a surveillance node 100 individually provides to the overall fitness of the surveillance network 180 [2].

Figure 2C:
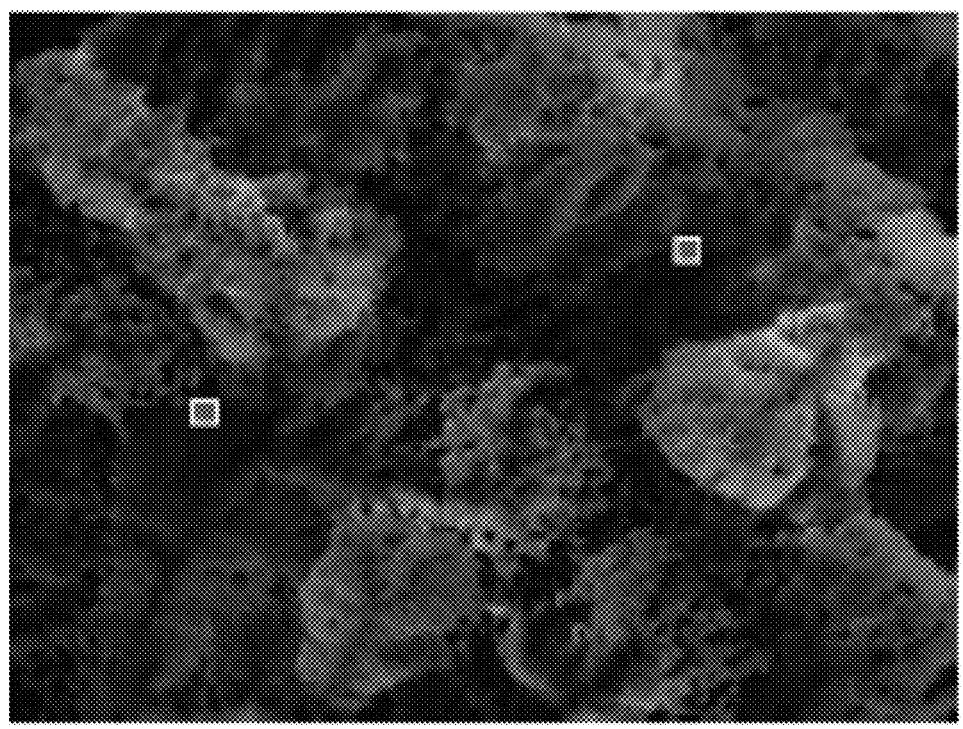
FIG. 2C is an image that illustrate an example of a wonderful life utility (WLU) map based on nodes positioned at terrain locations in FIG. 2A, according to an embodiment.

FIG. 2C is an image that illustrates an example of a WLU map 240 based on nodes positioned at terrain locations in FIG. 2A, according to an embodiment. The WLU map 240 shows a value for the WLU for all terrain locations of the map after two surveillance nodes 100 are placed at terrain locations 202c and 202d. The value of the WLU provided by the WLU map 240 at a particular terrain location indicates a contribution that a third surveillance node 100 would provide to overall network fitness if placed at that respective terrain location. Thus, the WLU map 240 is based on surveillance nodes 100 already placed at the terrain locations 202c and 202d. Brighter regions of the WLU map 240 indicate terrain locations with greater values of WLU and darker regions of the WLU map 240 indicate terrain locations with lower values of WLU. By comparing the range-limited cumulative visibility map 220 of FIG. 2B and the WLU map 240 of FIG. 2C, the value of the WLU in regions far from the placed nodes is comparable to the value of the range-limited cumulative visibility of those regions.

This observation is expected because placing an additional node far from the first two nodes will increase the fitness of the surveillance network 180 by the range-limited cumulative visibility at the additional node position. Similarly, looking at terrain locations close to the placed surveillance nodes, the WLU is much lower than the corresponding range-limited cumulative visibility. This result is also expected since there is little benefit to locating an additional node near either of the placed nodes.

Figure 3A:
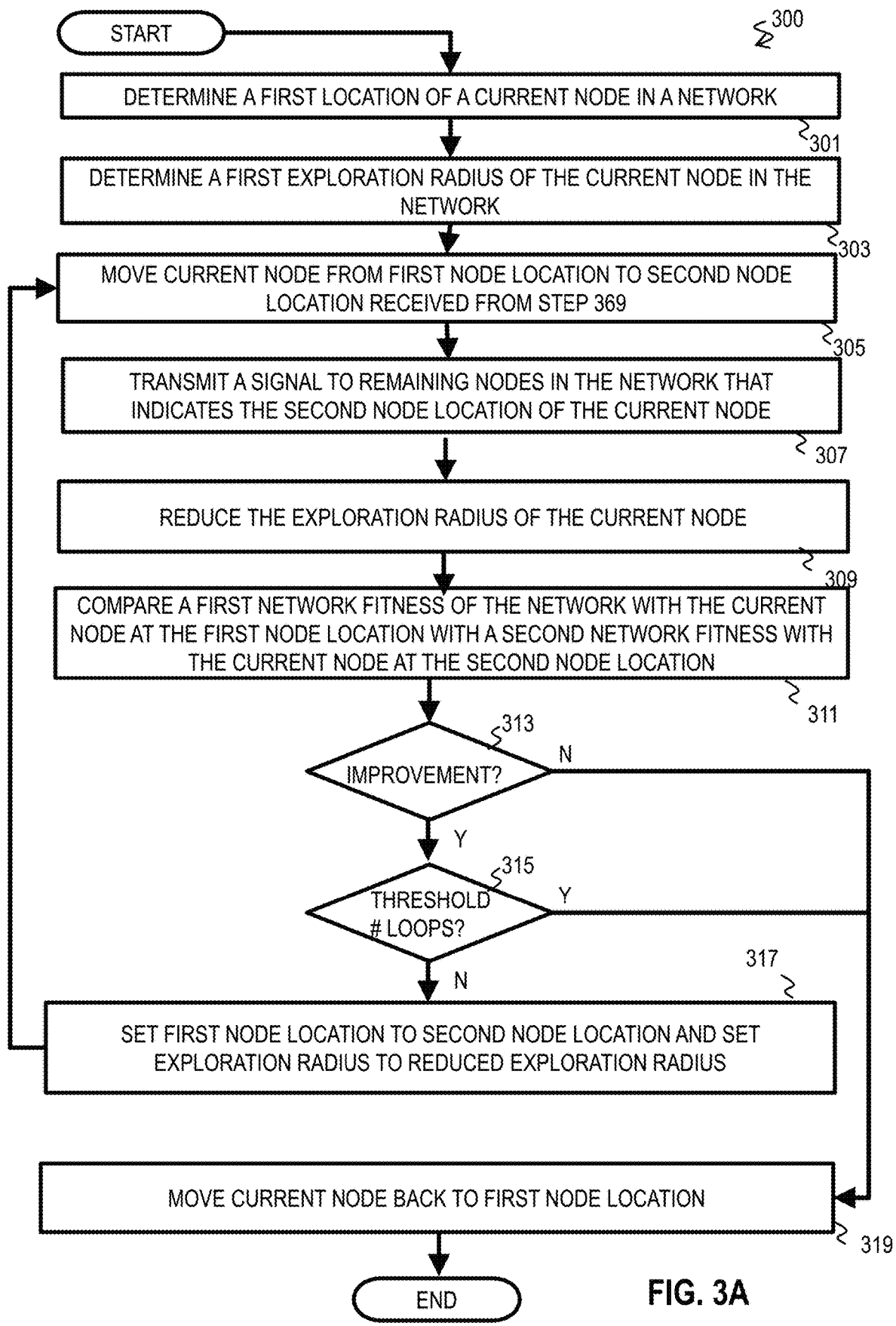
FIGS. 3A and 3B are flow diagrams that illustrate an example of a method for efficient deployment of the surveillance node of FIG. 1A in the surveillance network of FIG. 1B, according to an embodiment.
Figure 3B:
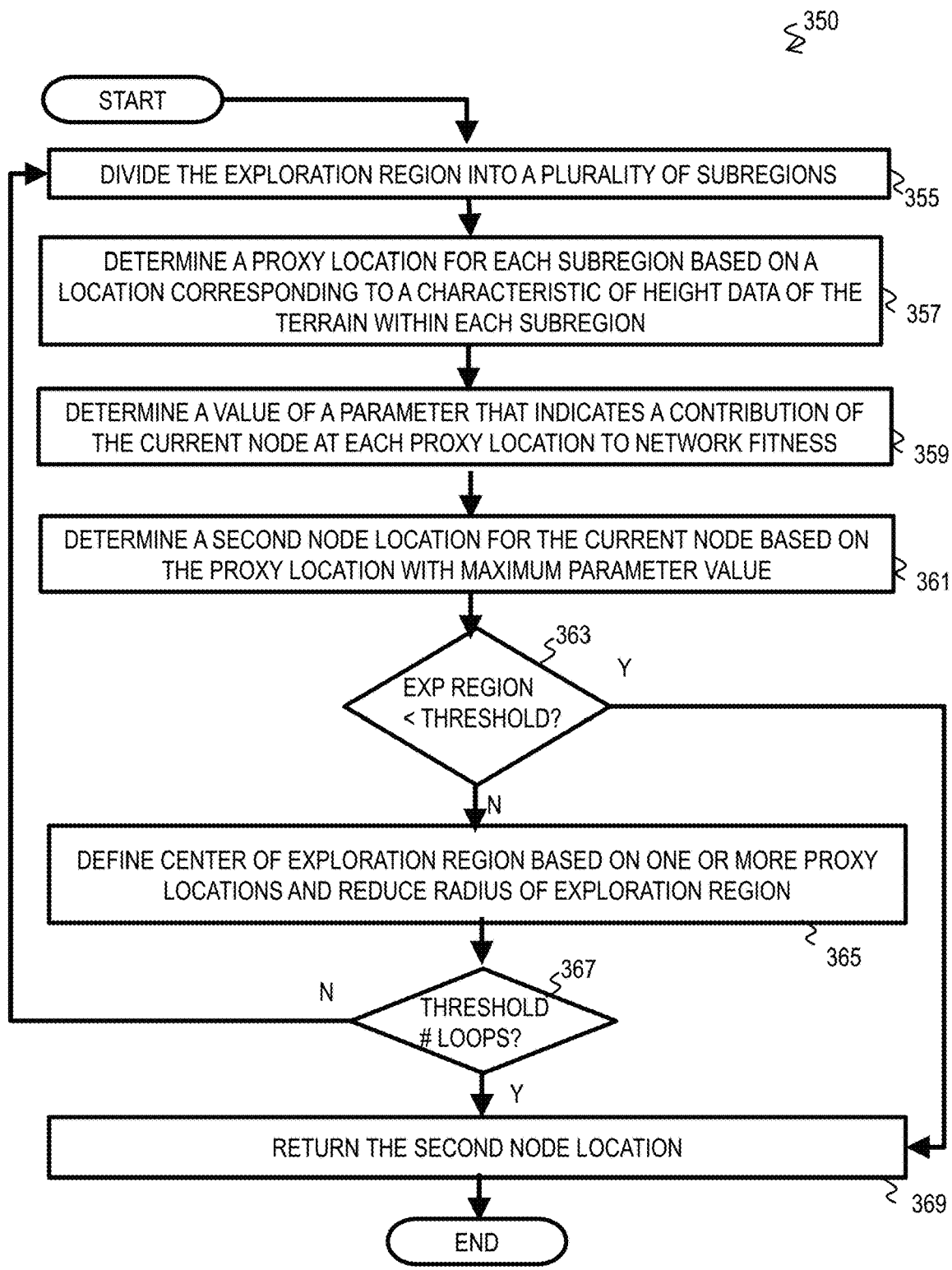

FIGS. 3A and 3B are flow diagrams that illustrate an example of methods 300, 350 for efficient independent deployment of surveillance nodes, such as the deployment of the surveillance node 100d of FIG. 1A in the surveillance network 180 of FIG. 1B, according to an embodiment. In one embodiment, the method 350 of FIG. 3B is utilized to choose a best candidate node location among a plurality of candidate node locations for a current surveillance node (e.g. surveillance node 100d) based on one or more nearby surveillance nodes. In another embodiment, the method 300 of FIG. 3A is utilized to receive the best candidate node location from the method 350 and confirm whether placement of the current surveillance node at the best candidate node location improves the network fitness. Although steps are depicted in FIG. 3A, and in subsequent flowchart FIG. 3B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, a first location is determined of the current surveillance node 100d in the surveillance network 180. In some embodiments, the current surveillance node 100d is a new surveillance node to be added to the surveillance network 180. In other embodiments, the current surveillance node 100d is an existing surveillance node of the surveillance network 180. In an example embodiment, in step 301 a first location of each surveillance node 100 in the surveillance network 180 is provided (e.g. by an algorithm that provides random initial locations for each surveillance node 100 of the surveillance network 180).

In some embodiments, step 301 includes receiving terrain data for use in determining where to locate or re-locate the local surveillance node, e.g., obtaining terrain data from a local or remote database, such as a proprietary or public, free or commercial, geographical information system (GIS). In some embodiments, step 301 includes measuring terrain data (height as a function of relative or absolute geographical location) from the local node, e.g., using a scanning laser or a 3D camera system along with a local GPS receiver or altimeter or some combination, in the observable vicinity of the local node.

Figure 4A:
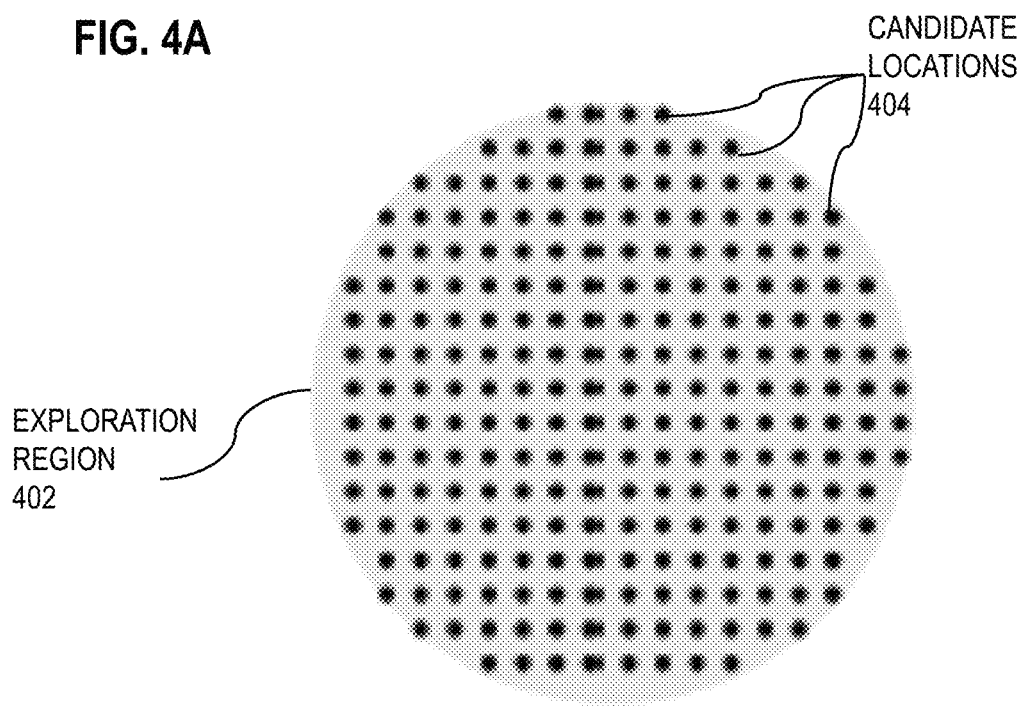
FIG. 4A is an image that illustrates an example of an exploration region with multiple candidate locations for a surveillance node to be deployed in a surveillance network, according to an embodiment.

In step 303, a radius of an exploration region 402 (FIG. 4A) is determined for the current surveillance node 100d in the surveillance network 180. In an embodiment, the exploration region 402 of the current surveillance node 100d is centered at the first location from step 301. The exploration region 402 is a region within which a best candidate location is determined for the current surveillance node 100d (using the method 350 of FIG. 3B).

In an embodiment, the radius 183 of the exploration region 402 is determined based on the value of the surveillance range 182 or the value of the communication range 184 of the surveillance node 100d, or both. In one embodiment, the radius 183 of the exploration region 402 is determined based on one or more constraints on the surveillance range 182 or the communication range 184, or both. These constraints are provided so that two neighboring surveillance nodes are aware when they cover the same region of the surveillance network 180. In one embodiment, as depicted in FIG. 1C, if two surveillance nodes 100 are separated by twice the surveillance range 182 (e.g. assuming all nodes 100 have the same surveillance range 182 and a clear LOS between the nodes 100) then they both can just cover a target 102 midway between them. Additionally, to be aware of each other's location, it is advantageous if the surveillance nodes' communication range 184 is at least twice the surveillance range 182:

$$R_c \geq 2*R_s \qquad (1)$$

where $R_c$ is the communication range 184 and $R_s$ is the surveillance range 182 of the surveillance nodes 100 (assuming the nodes 100 have the same surveillance range 182). In other embodiments, where the surveillance nodes 100 have different surveillance ranges, the right side of equation 1 is a sum of the surveillance ranges of the two surveillance nodes.

Since the current surveillance node 100d is relocatable, i.e., mobile or, at least, portable, the communication range 184 constraint of equation 1 is increased by a maximum possible distance that the current surveillance node 100d could be re-located (within the exploration region 402) away from the first location (from step 301) before communicating with its neighboring nodes again. In an embodiment, this maximum possible distance is the radius 183 of the exploration region 402 to be determined in step 303:

$$R_c \geq 2*R_s + R_e \qquad (2)$$

where $R_e$ is a radius of the exploration region 402. The inequality in equation 2 assumes non-moving neighboring surveillance nodes 100 to the current surveillance node 100d. As depicted in FIG. 1D, if the current surveillance node 100d and its neighboring surveillance nodes 100 move simultaneously away from each other by the exploration radius 183, the constraint on the communication range 184 from equation 2 is increased by another radius of the exploration region 402:

$$R_c \geq 2*R_s + 2*R_e \qquad (3)$$

Equation 4 can be rearranged to generate a maximum constraint on the radius of the exploration region 402:

$$R_e \leq \tfrac{1}{2}*R_c - R_s \qquad (4)$$

In an embodiment, this constraint on the radius 183 of the exploration region 402 is sufficient and advantageous to prevent other surveillance nodes 100 that are not communicating (e.g. separated from the current surveillance node 100d by a distance greater than $R_c$) with the current surveillance node 100d from inadvertently covering the same area of interest after moving.

In an embodiment, the radius 183 of the exploration region 402 is determined using equation 4 and values of the communication range 184 and surveillance range 182 of the surveillance nodes 100. However, the values of the radius 183 of the exploration region 402 determined in step 303 is not limited to the constraint of equation 4.

In an embodiment, the exploration region 402 is determined based on a center of the exploration region 402 (e.g. from step 301) and a radius of the exploration region 402 (e.g. from step 303). Using the exploration region 402 determined in steps 301 and 303, the method 300 then determines a best candidate location for the surveillance node 100d within the exploration region 402, e.g., using the method 350 of FIG. 3B. In an example embodiment, step 305 of the method 300 employs the method 350 of FIG. 3B to determine a best candidate location for the surveillance node 100d within the exploration region 402, as described in a later section.

Once the method 350 returns the second node location of the surveillance node 100d to the method 300, the method 300 then proceeds to confirm whether placement of the surveillance node 100d at the second node location improves the overall network fitness. In an embodiment, in step 305 once the method 350 returns the second location of the surveillance node 100, the method 300 moves the surveillance node 100d from the first location (from step 301) to the second location from the method 350. In an example embodiment, in step 305 the mobile terminal 124 transmits a signal to the mobility component 110 of the surveillance node 100d to cause the surveillance node 100d to move to the second node location.

In an embodiment, in step 307 once the surveillance node 100d is re-located to the second location (from step 305), the surveillance node 100d transmits signals to the remaining surveillance nodes (100a through 100c and 100e through 100g) of the second location of the surveillance node 100d. The transmission is direct for those nodes within communication range, and indirect, involving one or more network hops, to nodes outside direct communication range. In an example embodiment, in step 307 the signals are transmitted by the antenna 917. In an example embodiment, for those remaining surveillance nodes (e.g. 100a and 100g) that are outside of the communication range 184 of the surveillance node 100d, the signal indicating the second location of the surveillance node 100d are relayed to these surveillance nodes (e.g. 100a and 100g) through those surveillance nodes (e.g. 100c, 100e) that are within the communication range 184.

In an embodiment, in step 309 the exploration radius 183 of the exploration region 402 is reduced. In an example embodiment, in step 309 the exploration radius 183 is reduced in a similar manner as in step 365 (e.g. a ratio less than 1 of the previous exploration radius). In an example embodiment, in step 309 the exploration radius 183 is reduced based on a percentage reduction value in a range from about 30% to about 99%. In another example embodiment, the percentage reduction value used in step 309 is varied (e.g. reduced) with each iterative loop from step 305 through step 317.

In an embodiment, in step 311 a first network fitness is determined using the surveillance node 100d at the first location (from step 301), e.g., by computation or by retrieval from computer-readable memory, and a second network fitness is computed using the surveillance node 100d at the second location (from step 305). In one embodiment, the first network fitness is based on considering each surveillance node 100 in the surveillance network 180 with the surveillance node 100d at the first location (from step 301). In one embodiment, the second network fitness is based on considering each surveillance node 100 in the surveillance network and the surveillance node 100d at the second location (from step 305) and where the second location of the surveillance node 100d is communicated to the other surveillance nodes 100 in step 307. In an embodiment, in step 311 a comparison is made between a value of the first fitness and a value of the second fitness.

In an embodiment, in step 313 a determination is made whether the value of second fitness from step 311 is an improvement over the value of the first fitness from step 311. In some embodiment, "improvement" means that the value of the second fitness is greater than the value of the first fitness. In other embodiments, "improvement" means that the value of the second fitness is greater than a threshold value (e.g. 5%, 10%, etc.) of the value of the first fitness. If the determination in step 313 is affirmative, the method 300 moves to block 315. If the determination in step 313 is negative, the method 300 moves to block 319.

In an embodiment, in step 315 a determination is made whether the method 300 has looped through steps 305 to 313 a threshold number (e.g. 10) of loops. If the determination in step 315 is affirmative, the method 300 moves to block 319. If the determination in step 315 is negative, the method 300 moves to block 317.

In an embodiment, in step 317 the first node location of the surveillance node 100d is set to the second node location received in step 305 and the exploration radius 183 of the exploration region 402 is set to the reduced exploration radius from step 309. The method 300 then moves back to step 305 with this new exploration region with a center corresponding to the second node location from step 305 and the reduced exploration radius from step 309.

In an embodiment, in step 319 the current surveillance node 100d is moved from the second node location back to the first node location (from the previous iteration of step 317). In one embodiment, in step 319 the mobile terminal 124 transmits a signal to the mobility component 110 to move the surveillance node 100d back to the first location. In an embodiment, step 319 moves the current surveillance node 100d back to the first location (from step 317) since in step 313 it was determined that the most recent iteration of steps 305 through 311 did not improve the overall network fitness with the surveillance node 100d at the second location from step 305. In another embodiment, step 319 moves the current surveillance node 100d back to the first location from step 319 since in step 315 it was determined that the method 300 has looped through step 305 to step 311 a threshold number of times (e.g. and thus is unlikely to improve the network fitness with another iteration).

Figure 4B:
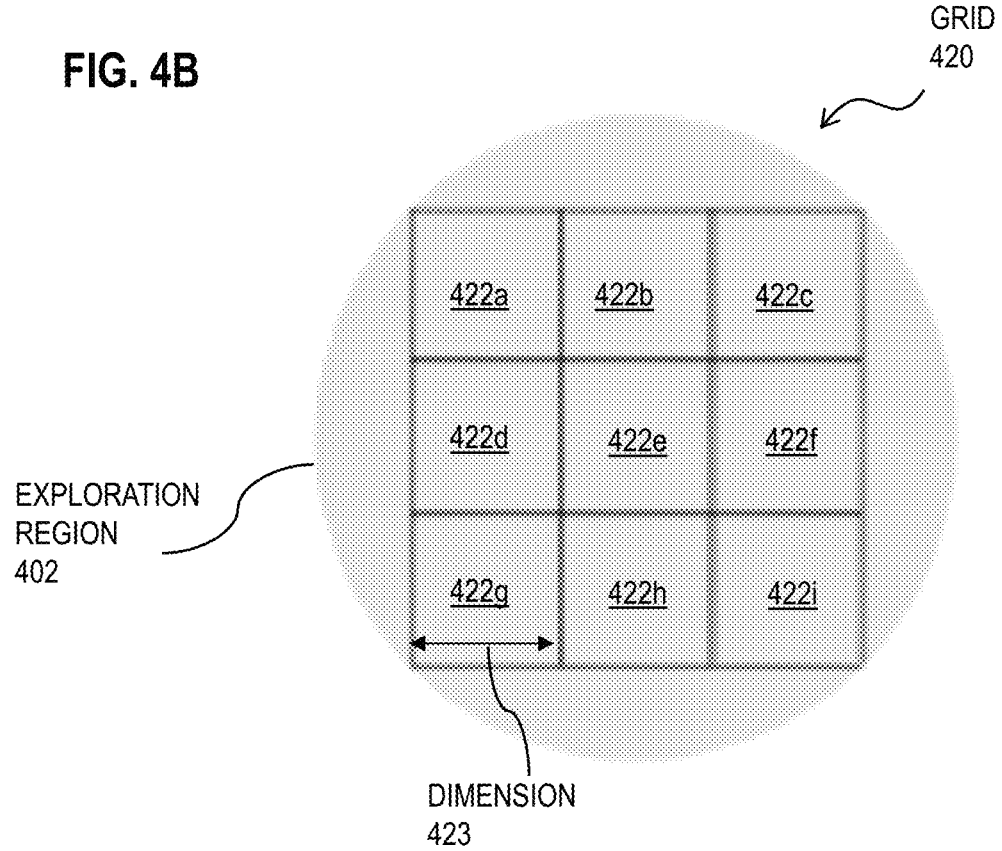
FIG. 4B is an image that illustrates an example of the exploration region of FIG. 4A divided into a plurality of subregions, according to an embodiment.

Returning to the method 350 of FIG. 3B, in the illustrated embodiment, step 355 involves dividing the exploration region 402 into a plurality of subregions. FIG. 4B is an image that illustrates an example of the exploration region 402 of FIG. 4A divided into a plurality of subregions 422a through 422i, according to an embodiment. In one embodiment, in step 355 the exploration region 402 is divided into a grid 420 of polygon shaped subregions 422a through 422i (e.g. square shaped subregions). In an example embodiment, the grid 420 is defined by a number (e.g. nine) of polygon-shaped subregions and/or a dimension 423 of each subregion. In some embodiments, the exploration region 402 is not divided into subregions and/or is just defined as one subregion and thus step 355 is omitted.

Figure 4C:
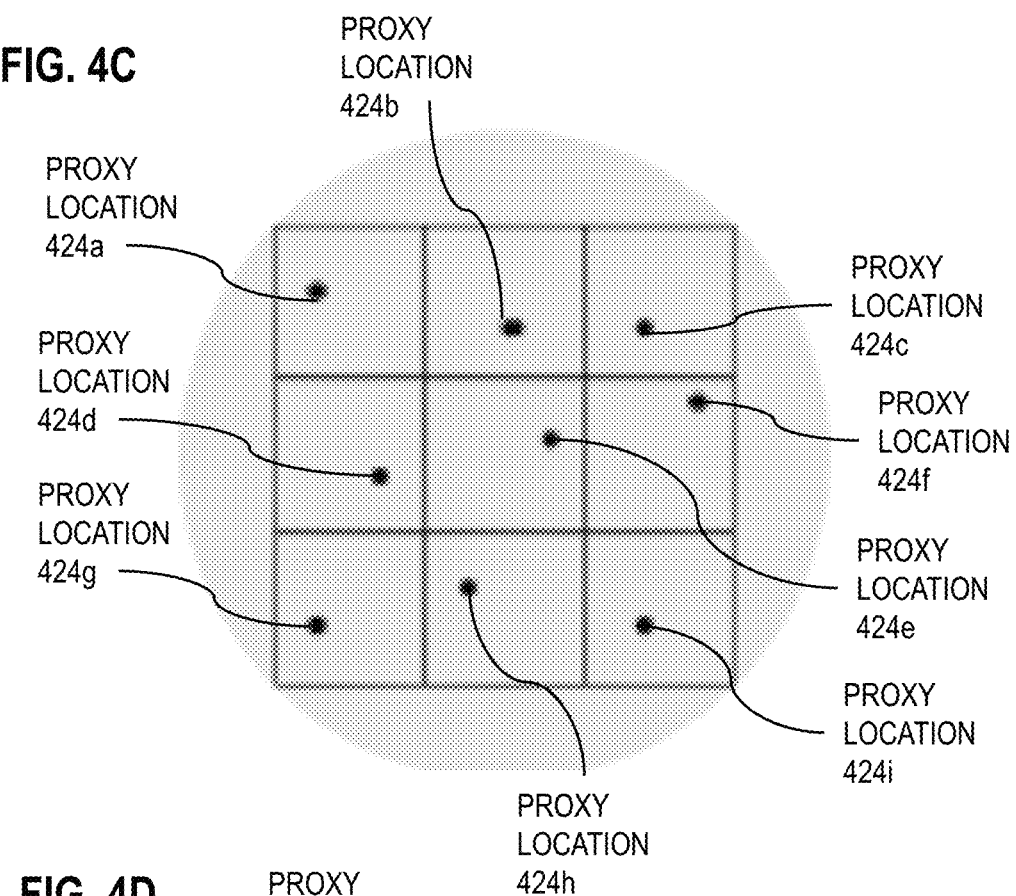
FIG. 4C is an image that illustrates an example of a proxy location within each subregion of FIG. 4B, according to an embodiment.

In an embodiment, step 357 involves determining a proxy location for each subregion from step 355. FIG. 4C is an image that illustrates an example of a proxy location 424 within each subregion 422 of FIG. 4B, according to an embodiment. This advantageously reduces the number of candidate node locations from the numerous candidate locations 404 in FIG. 4A to a much reduced number of proxy locations 424, reducing the number of locations for performing the intensive computation of the WLU algorithm, and thus enhancing the efficiency of the method. In one embodiment, the proxy location 424 for each subregion 422 is determined based on a simple computation based on the terrain data. For example, a location within the subregion 422 is selected, which location corresponds to a simple-to-compute characteristic of terrain data within the respective subregion 422.

In an example embodiment, the characteristic is a maximum value in the terrain height data within the respective subregion 422. In other example embodiments, the characteristic is another statistic of the terrain height data, such as one of a minimum value, an average value, a median value and/or a percentile value (e.g. $50^{th}$ percentile, $75^{th}$ percentile, etc.) of the height data within the respective subregion 422. Thus, the proxy locations 424a through 424i in FIG. 4C represent the locations that correspond to the characteristic (e.g. maximum value) of the terrain height data within each respective subregion 422a through 422i.

In an embodiment, step 359 involves determining a value of a parameter (e.g. WLU) that indicates a contribution of the current surveillance node 100d to the fitness of the surveillance network 180, which is a computationally intensive computation, only at each respective proxy location 424a through 424i. In one embodiment, step 359 involves determining a value of the WLU based on the current surveillance node 100d being positioned at each of the proxy locations 424a through 424i. In one embodiment, the WLU for the surveillance node 100d at each proxy location 424 is based on comparing the overall network fitness of the surveillance network 180 with the network fitness of an alternate world in which the surveillance node 100d does not exist. In this embodiment, the WLU is the individual contribution of the surveillance node 100d (at the proxy location 424) to the network fitness [1].

In an embodiment, the WLU of the surveillance node 100d can be accurately computed as long as three values are known: the location of the surveillance node 100d, the locations of neighboring nodes 100 and an understanding of visibility over the terrain [1]. Depending on the circumstances, the surveillance node 100d does not need to know the locations of all nodes 100 in the network [1]. In an example embodiment, in determining the WLU of the surveillance node 100d at each proxy location 424, only those surveillance nodes 100 within the communication range 184 of the surveillance node 100d need to be considered. In an example embodiment, this would include surveillance nodes 100b, 100c and 100e (e.g. assuming clear LOS to each of those nodes) from the surveillance network 180 of FIG. 1B, and exclude the surveillance nodes 100a, 100f and 100g.

Figure 4D:
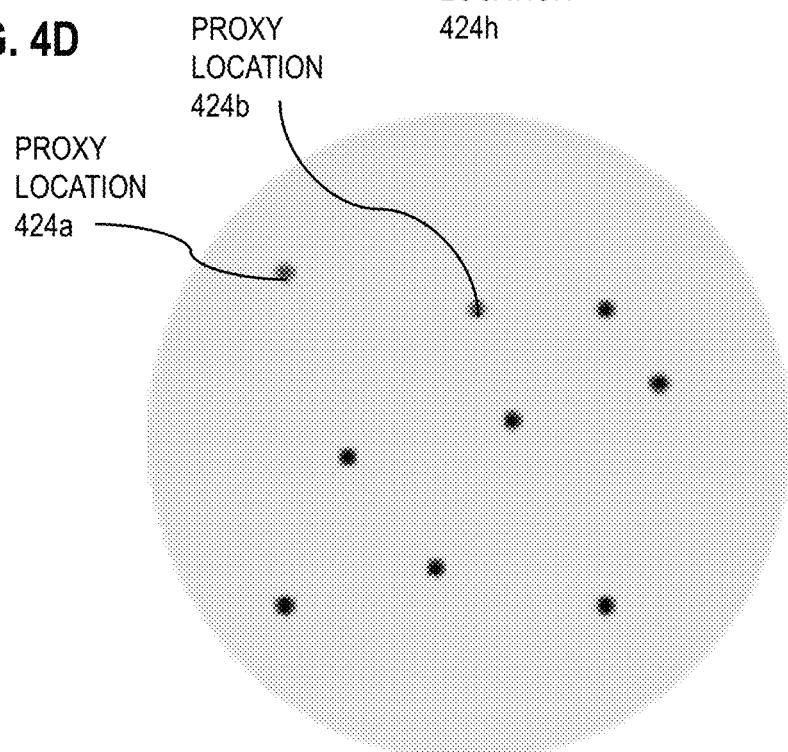
FIG. 4D is an image that illustrates an example of proxy locations selected from the plurality of proxy locations of FIG. 4C, according to an embodiment.

Returning to FIG. 3B, in step 361 one or more of the proxy locations 424 from step 357 is selected based on the values at each proxy location 424 from step 359 of the parameter that indicates a contribution of the current surveillance node 100d to the fitness of the surveillance network 180 (e.g., the value of WLU). In one embodiment, in step 361 the values of the parameter from step 359 are ranked from highest to lowest and/or one or more of the proxy locations 424 with the highest parameter values are selected. In an example embodiment shown in FIG. 4D, the two proxy locations 424a, 424b with the two highest parameter values are selected in step 361. In another example embodiment, the three proxy locations 424 with the three highest parameter values are selected. In an example embodiment, in step 361 the number of selected proxy locations is based on a ratio (e.g. less than 100% and advantageously less than 50%, or in some embodiments less than 33% or in some embodiments less than 25%) of the total number of proxy locations 424 (and total number of subregions 422) that is selected by a user. In other embodiments, where only one subregion 422 encompasses the exploration region 402, only one proxy location 424 with the largest value of the parameter is selected in step 361.

In an embodiment, the method 350 only continues as long as certain conditions are met (e.g. the exploration region 402 is sufficiently large to encompass the grid 420 with multiple subregions 422). If these conditions are not met (e.g. the exploration region 402 only encompasses one subregion 422 with the minimum dimension 423 between location-adjacent data points), then the method 350 moves to step 369. In an embodiment, in step 363 a determination is made whether a value of a dimension of the exploration region 402 (or the subregion 422) is smaller than a threshold value. In one embodiment, where the exploration region 402 has a circular shape, the dimension is the radius 183 (FIG. 4E) of the exploration region 402 and is compared with a threshold radius in step 363. In an embodiment the threshold value is based on a value for which the exploration region 402 can no longer be divided into more than one subregion 422 with the minimum dimension 423 (e.g. the exploration region 402 is sufficiently small that it is encompassed by one subregion 422 with the minimum dimension 423).

In an embodiment, in step 363 it is determined if the value of the dimension of the exploration region 402 is less than the threshold value. If so, the method 350 moves to step 369 and a second location of the surveillance node 100d is determined from the proxy locations 424 selected in step 361. In one embodiment, the second location is the proxy location 424 from step 361 with the maximum value of the WLU. In this embodiment, the second location of the surveillance node 100d is returned to the step 305 of the method 300. In this embodiment, the surveillance node 100d is then moved (e.g. using the mobility component 110) from the first location from step 301 to the second location obtained from step 369.

Figure 4E:
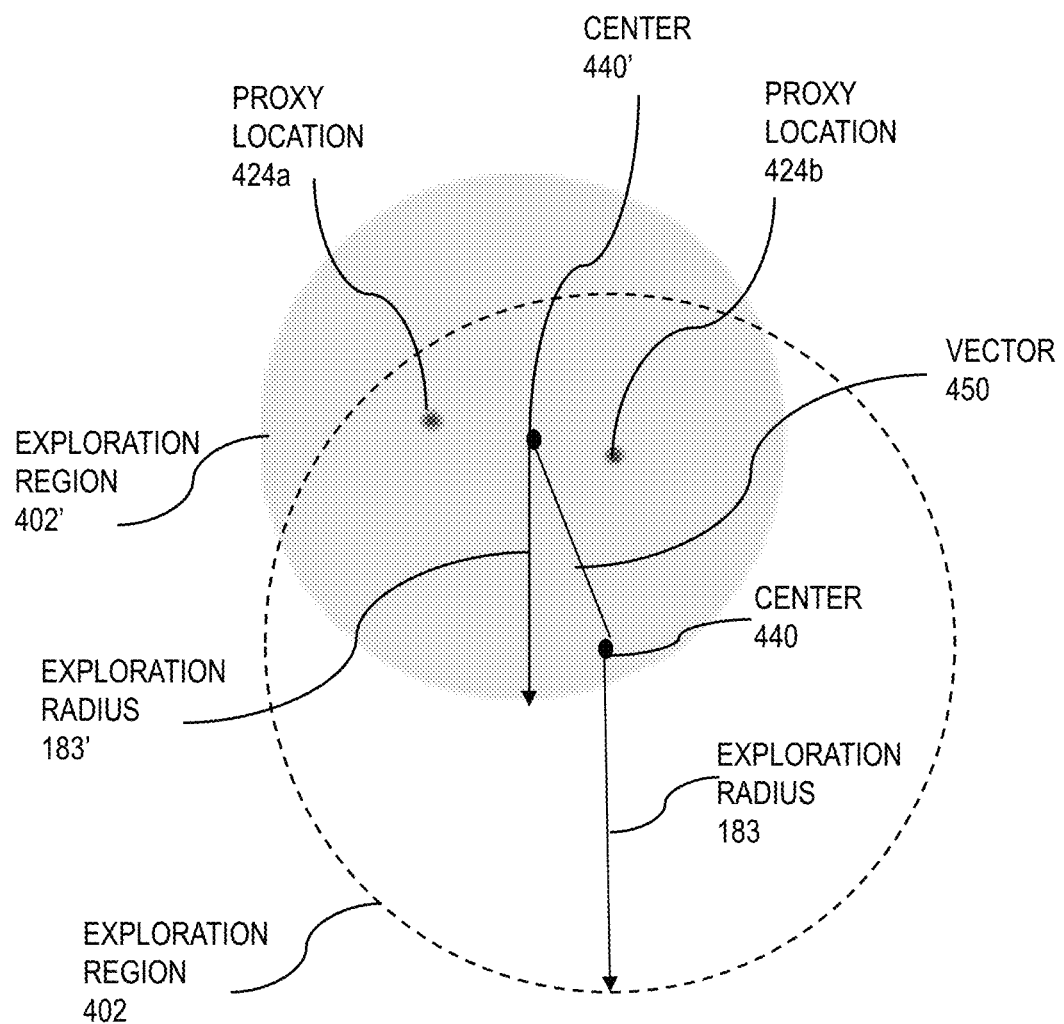
FIG. 4E is an image that illustrates an example of a next exploration region with a center based on the selected proxy locations of FIG. 4D and a reduced dimension from the exploration region of FIG. 4A, according to an embodiment.

In an embodiment, in step 363 if the value of the dimension of the exploration region 402 is not less than the threshold value, the method 350 moves to block 365 that determines a new exploration region and then moves back to block 355. Steps 355 through 361 are then repeated for the new exploration region. The new exploration region 402' is determined in step 365 based on the proxy locations 424 selected in step 361 and the exploration radius 183 of the previous exploration region 402. FIG. 4E is an image that illustrates an example of the new exploration region 402' determined in step 365 where the center 440' is based on the proxy locations 424a, 424b of FIG. 4D (selected in step 361). In an embodiment, the center 440' is a centroid of the proxy locations 424a, 424b selected in step 361. In another embodiment, the exploration radius 183' of the new exploration region 402' is based on the exploration radius 183 of the previous exploration region 402. In an example embodiment, the value of the exploration radius 183' is a ratio (e.g. less than 1) of the value of the exploration radius 183. A vector 450 in FIG. 4E depicts step 365 that moves the center 440 of the previous exploration region 402 to the new center 440' of the new exploration region 402'.

In an embodiment, in step 367 a determination is made of how many times the method 350 has looped through steps 355 to 365. If the method 350 has not looped through steps 355 to 365 a predetermined number (e.g. 10) of times, the method 350 returns to step 355 based on the new exploration region 402' defined in step 365. If the method 350 has looped through steps 355 to 365 the threshold number of times, then the method 350 moves to step 369 and the second location of the current surveillance node 100d is returned to step 305. In an embodiment, if multiple proxy locations 424 were selected in the previous iteration of step 361, the second location of the current surveillance node 100d in step 369 is a centroid of the proxy locations 424.

In an embodiment, the methods 300 and 350 are performed for each surveillance node 100 of the surveillance network 180, in order to determine the best node location for each surveillance node 100 that improves the overall network fitness of the surveillance network 180. In still other embodiments, the methods 300 and 350 can be employed for "incremental deployment", where the methods 300 and 350 are employed to determine best node locations for each surveillance node 100 in the surveillance network 180, after which the methods 300 and 350 are utilized at a later time when one or more subsequent surveillance nodes 100 are deployed in the surveillance network 180.

2. EXAMPLE EMBODIMENTS

In an example embodiment, for sample deployment regions, terrain datasets were used from National Aeronautics and Space Administration (NASA) 2005 Shuttle Radar Topography Mission (SRTM) [3] [4]. This NASA mission collected elevation, or height, data for much of the landmass of the Earth and provides it in several datasets called a digital elevation models or DEMs [5]. The DEM that was used provides the height for positions on the Earth at a resolution of 1-arcsec, which is about 30 meters or 100 feet in the latitude direction.

Figure 5:
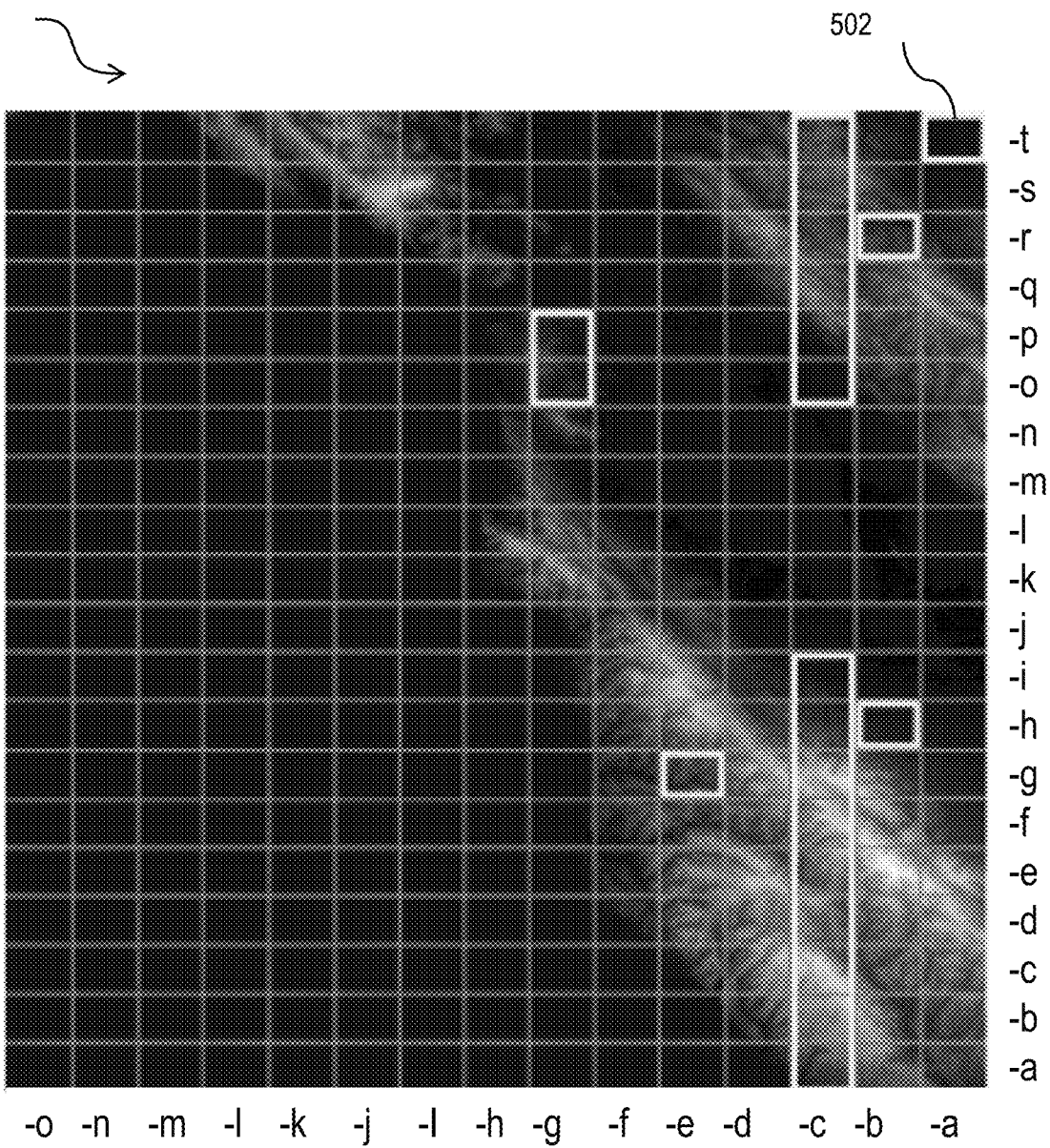
FIG. 5 is an image that illustrates an example of a plurality of terrain regions in a height map of an area under surveillance, according to an embodiment.

In an embodiment, the SRTM data is organized in 3600× 3600 arcsec "tiles." FIG. 5 is an image that illustrates an example of a plurality of terrain regions in a height map 500 of an area under surveillance, according to an embodiment. In an embodiment, the height map 500 of FIG. 5 is a height map of tile N37W123 and divided into subtiles 502 that are 240 pixels wide and 180 pixels high. In an example embodiment, 21 subtiles were selected, as indicated in the height map 500, that represent a variety of terrains. The coordinates of the SRTM data are measured in arc seconds of latitude and longitude, but the algorithm uses cartesian coordinates in meters. One normally would perform a coordinate conversion through a resampling of the DEM height data, which would introduce some interpolation errors in the heights. However, since field verification is not performed, Earth-accurate coordinates are not necessary. Instead the SRTM data is treated as if it was taken at the Earth's equator and each DEM sample is interpreted as representing a flat 33×33 meter patch of terrain.

Since the inner loop of the Grid Partition algorithm (e.g. method 350) is greedy, it was compared with two other greedy algorithms: Pattern Search and Gradient Descent. For each of these three algorithms numerous simulations were run per terrain subtile 502. Each simulation used 10 nodes with simulations run for ten different sets of random starting positions. To evaluate the effect of the initial value of $r_E$ on the algorithms, each of the conditions above was tested with six different initial $r_E$ values from 10 to 76 arc seconds (e.g. value of the initial exploration radius in step 353). In one embodiment, the surveillance range 182 was set to 50 arc seconds since this value allows 100% coverage of a 240×180 subtile 502 with proper placement on a flat plane. The maximum-loop limits L and M (e.g. values for threshold in steps 315 and 367, respectively) both were 10. In an example embodiment, the value of L or M can be selected in a range from about 2 to about 100 and/or from about 3 to about 50. It was observed that using values for L or M of 100 or more did not improve results and increased run times unnecessarily. Additionally, it was observed that using values for L or M of less than 3 caused the algorithm to terminate before easy-to-find improvements were uncovered. The value of A (e.g. ratio of exploration radius 183' to exploration radius 183 in FIG. 4E) was set to 0.9 or in a range from about 0.3 to about 0.99. It was observed that selecting a value for A more than 0.99 is unlikely to improve results in the algorithm, while using a value of less than 0.3 may cause the algorithm to terminate before an improved result is found. The sensitivity of the algorithm was not evaluated based on the values of these three parameters. For a subset of the runs three different values were evaluated for no: 5, 10, and 21 (e.g. number of subregions 422 in the grid 420). In Step 6 of the outer loop (e.g. step 309) for historical reasons, the simulation uses a sequence of values of $r_E$ that are these multiples of the initial $r_E$: 100%, 92%, 85%, 77%, 69%, 62%, 54%, 46%, 38%, and 31%, with L=10. Although this sequence of values appears to be a linear reduction, in other embodiments any monotonically decreasing sequence that has approximately the same rate as the example sequence of values will likely suffice. Using a sequence that decreases more quickly will not cause an incorrect result, but it may hurt the resulting overall coverage. Additionally, using a sequence that decreases more slowly may increase run time. The results of the methods 300 and 350 were also compared to a centralized set cover algorithm, which is expected to perform well because it is centralized and does not attempt to limit the number of fitness computations as the Grid Partition (e.g. method 350) does. Additionally, simulations were run for random placement, with 100 random seeds per subtile 502, and simulations were run placing nodes on a regular triangular grid.

Performance data of the methods 300 and 350 are now discussed, in comparison to conventional methods for deployment of surveillance nodes in a surveillance network. The distributed grid partition deployment algorithm (e.g. method 350) was compared with the centralized set cover algorithm, the distributed versions of pattern search and gradient descent. Additionally, each algorithm was compared to the results of placing nodes randomly as opposed to placing them in a regular triangular grid. Since the results of grid partition, pattern search, and gradient descent algorithms all depend on the initial node positions, these algorithms were run under the same conditions: for each subtile 502 each algorithm was run ten times using ten different initial node placements. Random placements were evaluated using 100 seeds, and the results for each subtile were averaged. Placement on a regular grid was performed only once per tile since the algorithm has no random aspect in its operation.

Figure 6A:
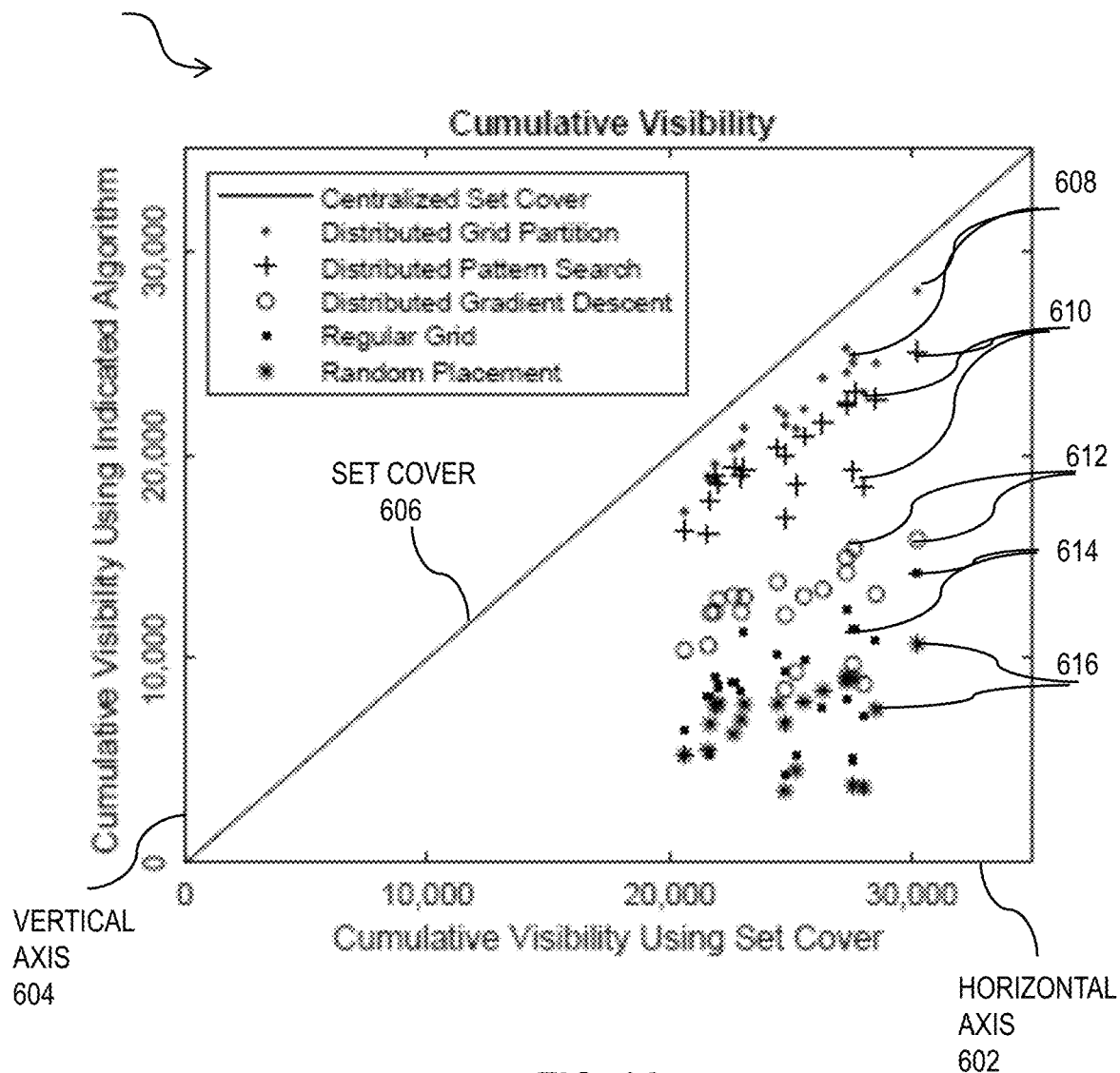
FIG. 6A is a graph that illustrates range-limited cumulative visibility for node deployment in the terrain regions of FIG. 5 using different deployment methods.

FIG. 6A is a graph 600 that illustrates range-limited cumulative visibility for node deployment in the terrain regions of FIG. 5 using different deployment methods. The horizontal axis 602 is range-limited cumulative visibility of the set cover algorithm in units of targets. The vertical axis 604 is range-limited cumulative visibility of the grid partition (e.g. method 350) algorithm in units of targets. A curve 606 indicates the range-limited cumulative visibility of the set cover algorithm. Each data point in the graph 600 represents the value of the range-limited cumulative visibility as determined by the indicated algorithm for one of the 21 terrain subtiles 502. Considering all of the algorithms evaluated, centralized set cover is the best since the values of the curve 606 exceed the range-limited cumulative visibility of other algorithms. The distributed grid partition algorithm (e.g. method 350) are indicated by points 608 in the graph 600 and comes in second, immediately under the curve 606. FIG. 6A also shows that the results of the remaining algorithms clearly are ranked from best to worst as pattern search (points 610), gradient descent (points 612), regular grid (points 614), and random placement (points 616).

The three distributed algorithms all use a value for the exploration radius $r_E$=51 arc seconds. In an embodiment, this parameter helps prevent nodes from moving too far during a single iteration of the distributed algorithms' outer loop (e.g. steps 305 through 317 of the method 300). Having too small a value of $r_E$ will hurt an algorithm's results, as a node is unable to travel a sufficient distance to discover its best position. On the other hand, too large a value of $r_E$ could let a pair of nodes "overshoot" their best positions as they move toward each other, each node being unaware of its own effect on the WLU of the other node. Once discovering the overshoot, the nodes will need to retreat, which increases their execution time.

Figure 6B:
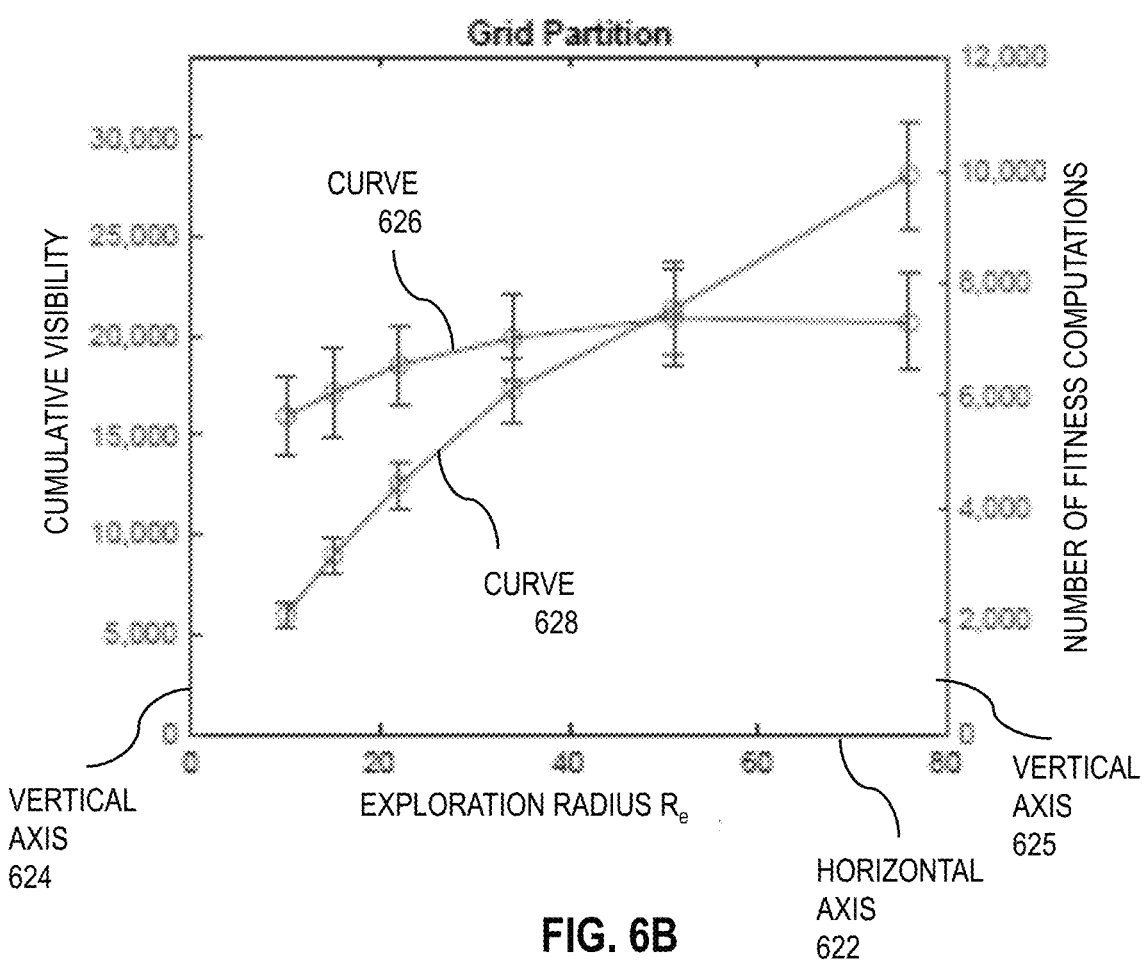
FIG. 6B is a graph that illustrates range-limited cumulative visibility for node deployment in the terrain regions of FIG. 5 according to an embodiment.
Figure 6C:
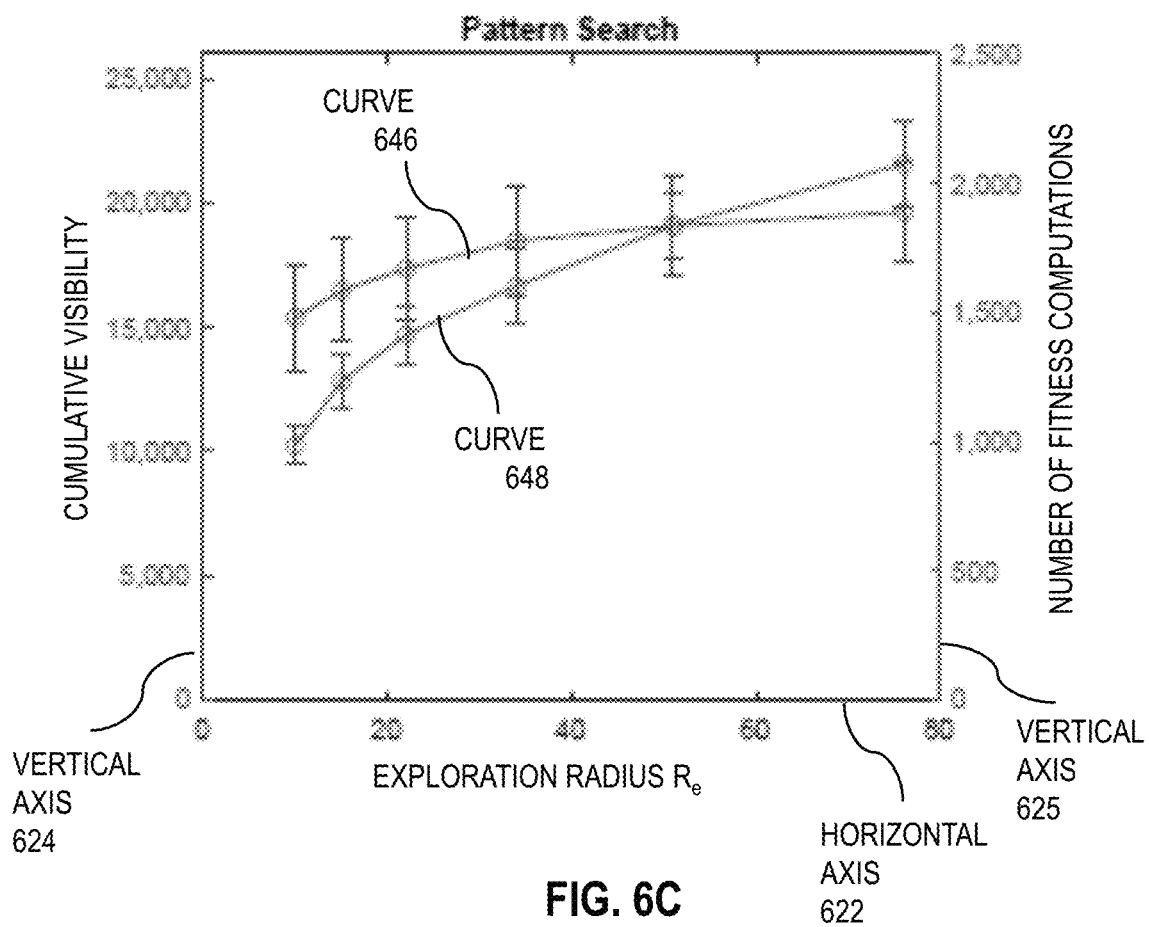
FIGS. 6C and 6D are graphs that illustrate range-limited cumulative visibility for node deployment in the terrain regions of FIG. 5 according to different deployment methods.
Figure 6D:
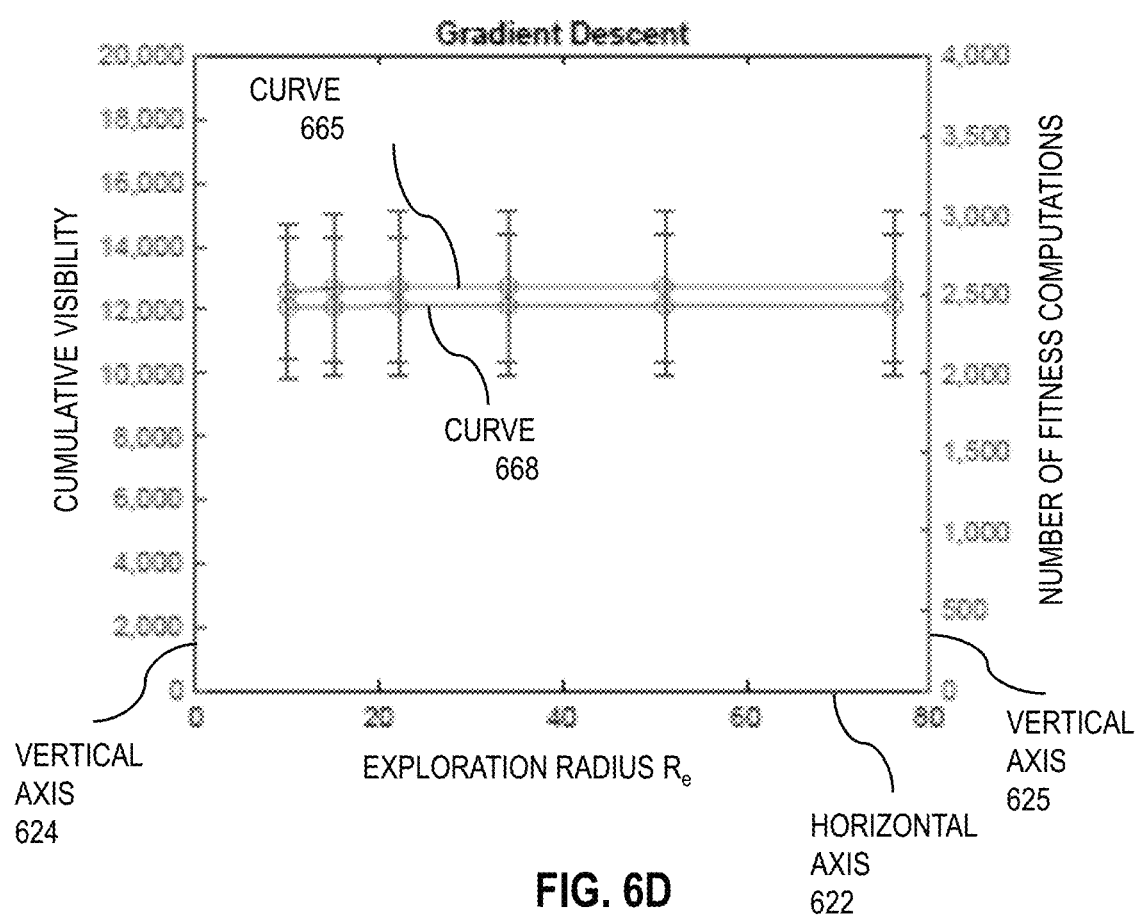

The sensitivity of grid partition, pattern search, and gradient descent were explored for different values of $r_E \in \{10, 15, 21, 34, 51, 76\}$. FIG. 6B is a graph 620 that illustrates range-limited cumulative visibility for node deployment in the terrain regions of FIG. 5 according to an embodiment. FIGS. 6C and 6D are graphs 640 and 660 that illustrate range-limited cumulative visibility for node deployment in the terrain regions of FIG. 5 according to different deployment methods. The horizontal axis 622 is the exploration radius $r_E$ in units of meters. The left vertical axis 624 is cumulative visibility in units of targets. The right vertical axis 625 is number of fitness computations. FIGS. 6B through 6D show the average range-limited cumulative visibility for 210 runs at each value of $r_E$. (e.g., ten runs on each of the 21 subtiles 502.) The graphs show curves 626, 646, 665 that indicate the cumulative visibility of the respective grid partition, pattern search and gradient descent algorithms. Additionally, the graphs show curves 628, 648, 668 that indicate the number of fitness computations for the respective grid partition, pattern search and gradient descent algorithms. FIG. 6B depicts that the grid partition algorithm clearly is well tuned with $r_E$=51 meters since either increasing or decreasing $r_E$ hurts the average result. FIG. 6C shows that the pattern search is nearly tuned at $r_E$=51, with an increase in $r_E$ beyond this yielding only a small improvement in the average range-limited cumulative visibility but a much larger increase in execution time. FIG. 6D shows that the gradient descent is essentially unaffected by the value of $r_E$. The suspected reason for this is because the algorithm gets "stuck" when it responds to "noise" in the gradient approximation (i.e., gradient descent performs best when its gradient is smooth.)

Figure 6E:
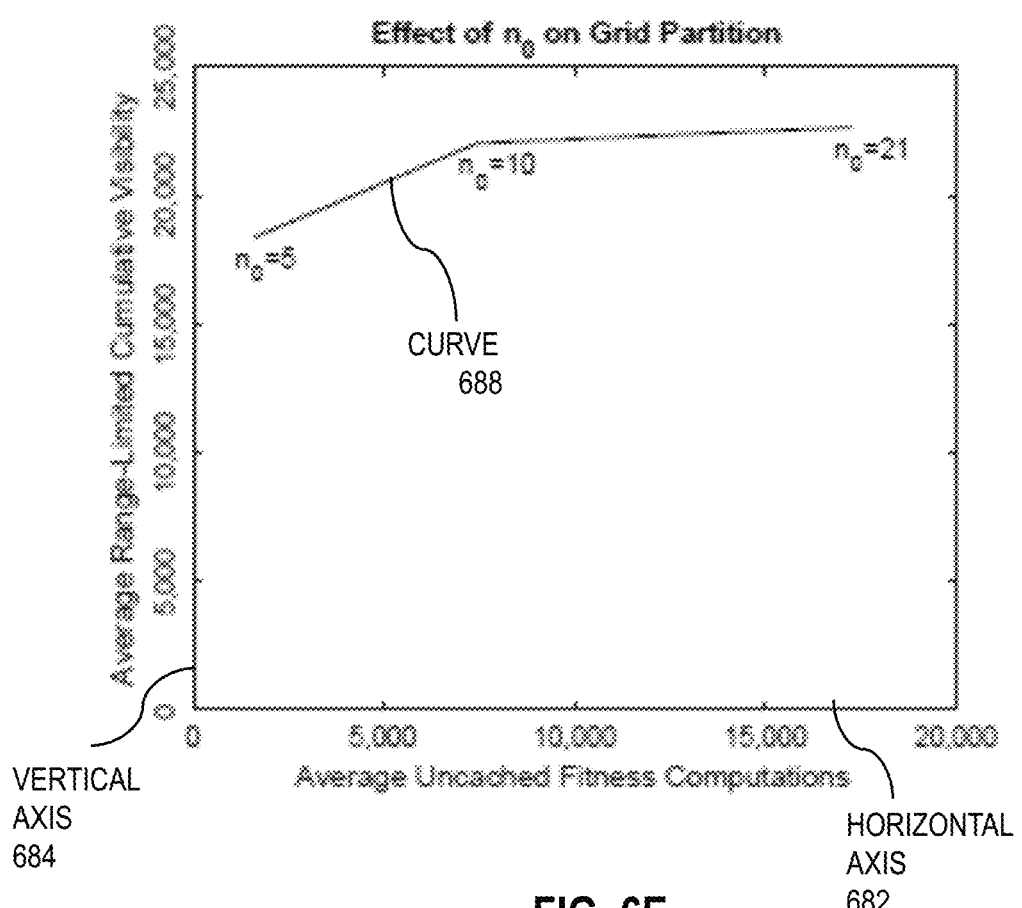
FIG. 6E is a graph that illustrates range-limited cumulative visibility for node deployment in the terrain regions of FIG. 5 for different values of an effort parameter, according to an embodiment.

FIG. 6E is a graph 680 that illustrates range-limited cumulative visibility for node deployment in the terrain regions of FIG. 5 for different values of an effort parameter, according to an embodiment. The effort parameter no controls the effort taken by the algorithm (e.g. affects steps 355 through 361 of the method 350). In an example embodiment, the value of no is the number of grid squares (e.g. number of square subregions 422 in FIG. 4B) that the algorithm tries to partition the exploration region into, where each square will cause a fitness computation. Thus, a larger value for no will cause the algorithm to examine the WLU of more positions, but at a cost of a longer run time. A smaller value for no will reduce run time but may hurt the result by examining too few positions The graph 680 demonstrates that beyond a value of 10, increasing the number of grid squares does not substantially increase the range-limited visibility of the algorithm. Thus, in one embodiment, the effort parameter no is set to a value to about 10 or in a range from about 8 to about 12.

3. HARDWARE OVERVIEW

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit)). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general, the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

FIG. 9 is a diagram of exemplary components of a mobile terminal 900 (e.g., cell phone handset) for communications, which is capable of operating in the system of FIG. 2C, according to one embodiment. In some embodiments, mobile terminal 901, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps as described herein. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 as described herein. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

In some embodiments, the mobile terminal 901 includes a digital camera comprising an array of optical detectors, such as charge coupled device (CCD) array 965. The output of the array is image data that is transferred to the MCU for further processing or storage in the memory 951 or both. In the illustrated embodiment, the light impinges on the optical array through a lens 963, such as a pin-hole lens or a material lens made of an optical grade glass or plastic material. In the illustrated embodiment, the mobile terminal 901 includes a light source 961, such as a LED to illuminate a subject for capture by the optical array, e.g., CCD 965. The light source is powered by the battery interface and power control module 920 and controlled by the MCU 903 based on instructions stored or loaded into the MCU 903.

4. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

5. REFERENCES

[1] K. Veenstra and K. Obraczka, "Guiding Sensor-Node Deployment Over 2.5D Terrain", In Proceedings of IEEE International Conference on Communications, 2015

[2] David H. Wolpert. "General principles of learning-based multi-agent systems." AGENTS '99: Third International Conference of Autonomous Agents, Seattle Wash., USA. 1999. pp. 77-83. ACM Press.

[3] E. Rodriguez, C. S. Morris, J. E. Belz, E. C. Chapin, J. M. Martin, W. Daffer, and S. Hensley, "An assessment of the SRTM topographic products," Jet Propulsion Laboratory, Pasadena, Calif., Tech. Rep. JPL D-31639, 2005.

[4] E. Rodriguez, C. S. Morris, and J. E. Belz, "A global assessment of the SRTM performance," Photogrammetric Engineering & Remote Sensing, vol. 72, pp. 249-260, 2006.

[5] K.-t. Chang, Introduction to geographic information systems, 6th ed. McGraw-Hill, 2012.

What is claimed is:

1. A method comprising:
   a) obtaining, on a processor, first data that indicates a plurality of first locations of a respective plurality of nodes in a network over a terrain and terrain data that indicates height of terrain at a plurality of terrain locations in an area under surveillance;
   b) determining, on the processor, an exploration region for a first node of the plurality of nodes;
   c) dividing, on the processor, the exploration region into a plurality of subregions;
   d) determining, on the processor, a proxy location for each subregion of the exploration region, said proxy location being a location corresponding to a characteristic of the terrain data within the respective subregion;
   e) determining, on the processor, a value of a parameter that indicates a contribution of the first node at each proxy location to network fitness of the plurality of nodes based on the terrain data;
   f) assigning, with the processor, a second location to the first node based on the determined value of the parameter at each proxy location; and
   g) relocating the first node from the first location to the second location.

2. The method as recited in claim 1, wherein the characteristic is a maximum value of the terrain data within the respective subregion.

3. The method as recited in claim 1, wherein the characteristic is one of an average value, a median value and a percentile value of the terrain data within the respective subregion.

4. The method as recited in claim 1, wherein said dividing the exploration region into the plurality of subregions comprises dividing the exploration region into a grid of polygon shaped subregions.

5. The method as recited in claim 1, wherein step f) comprises:
   selecting, on the processor, one or more first proxy locations from the plurality of proxy locations when the value of the parameter at the one or more first proxy locations is greater than the value of the parameter at the remaining proxy locations;
   adjusting, with the processor, a location of the exploration region based on the one or more first proxy locations;
   reducing, with the processor, a value of a dimension of the exploration region; and
   repeating steps b)-f) for the exploration region with the adjusted location and the reduced value of the dimension until the reduced value is less than a threshold value.

6. The method as recited in claim 5, wherein the adjusting step comprises determining a centroid of the one or more first proxy locations.

7. The method as recited in claim 5, wherein the second location is the first proxy location corresponding to a maximum value of the parameter among the plurality of proxy locations.

8. The method as recited in claim 6, wherein the second location is the centroid of the one or more first proxy locations.

9. The method as recited in claim 1, wherein step b) comprises determining a center of the exploration region based on the first location of the first node and determining a dimension of the exploration region based on at least one of a value of a surveillance range and a value of a communication range of the first node.

10. The method as recited in claim 9, wherein the dimension of the exploration region is based on the value of the surveillance range and the value of the communication range of the first node.

11. The method as recited in claim 1, wherein step e) further comprises determining the value of the parameter based on the first node at each proxy location and a subset of the remaining nodes at the respective first locations in the network.

12. The method as recited in claim 11, wherein the subset of the remaining nodes are defined based on the first locations of the subset being within a threshold range of each proxy location of the first node, wherein the threshold range is based on a first communication range of the first node and a second communication range of the respective node of the subset.

13. The method as recited in claim 1, wherein between steps f) and g) the method further comprises:
   determining, on the processor, a first value of a network fitness based on the plurality of first locations of the respective plurality of nodes in the network; and
   determining, on the processor, a second value of the network fitness based on the second location of the first node and the respective first locations of the remaining nodes in the network; and
   wherein step g) is performed based on a difference between the second value and the first value being greater than a threshold difference.

14. The method as recited in claim 13, further comprising receiving, at the first node, a plurality of signals indicating a respective current location of the remaining nodes; and wherein the first value of the network fitness and the second value of the network fitness are determined based on the current location of the remaining nodes.

15. The method as recited in claim 13, further comprising transmitting, from the first node, a signal indicating the second location of the first node to the remaining nodes; and wherein steps b)-g) are repeated for each of the remaining nodes based on the second location of the first node.

16. A non-transitory computer-readable medium carrying one or more sequences of instructions, wherein execution of the one or more sequences of instructions by one or more processors causes the one or more processors to perform the steps of:
   a) obtain first data that indicates a plurality of first locations of a respective plurality of nodes in a network over a terrain and terrain data that indicates height of the terrain at a plurality of terrain locations in an area under surveillance;
   b) determine an exploration region for a first node of the plurality of nodes;
   c) divide the exploration region into a plurality of subregions;

d) determine a proxy location for each subregion of the exploration region, said proxy location being a location corresponding to a characteristic of the terrain data within the respective subregion;

e) determine a value of a parameter that indicates a contribution of the first node at each proxy location to network fitness of the plurality of nodes based on the terrain data;

f) assign a second location to the first node based on the determined value of the parameter at each proxy location; and g) transmit a signal indicating the second location to relocate the first node from the first location to the second location.

17. A surveillance node, comprising:

a surveillance sensor configured to sense objects within a surveillance range of the surveillance node;

an antenna configured to transmit and receive signals within a communication range of the surveillance node;

a mobility component configured to facilitate movement of the surveillance node over a terrain;

a support to couple the mobility component with the surveillance sensor and the antenna;

at least one processor; and at least one memory including one or more sequences of instructions, the at least one memory and the one or more sequences of instructions configured to, with the at least one processor, cause the surveillance node to perform at least the following, a) obtain first data that indicates a plurality of first locations of a respective plurality of surveillance nodes including the surveillance node and remaining surveillance nodes in a surveillance network over the terrain and terrain data that indicates height of the terrain at a plurality of terrain locations in an area under surveillance;

b) determine an exploration region for the surveillance node;

c) divide the exploration region into a plurality of subregions;

d) determine a proxy location for each subregion of the exploration region, said proxy location being a location corresponding to a characteristic of the terrain data within the respective subregion;

e) determine a value of a parameter that indicates a contribution of the surveillance node at each proxy location to network fitness of the plurality of surveillance nodes based on the terrain data;

f) assign a second location to the surveillance node based on the determined value of the parameter at each proxy location; and g) transmit a signal indicating the second location to the mobility component to relocate the surveillance node from the first location to the second location.

18. The surveillance node as recited in claim 17, wherein the determination of the exploration region comprises determining a center of the exploration region based on the first location of the surveillance node and determining a dimension of the exploration region based on at least one of a value of the surveillance range of the surveillance sensor and a value of the communication range of the antenna.

19. The surveillance node as recited in claim 17, wherein the determination of the value of the parameter is based on the surveillance node at each proxy location and a subset of the remaining nodes within a threshold range of each proxy location of the surveillance node and wherein the threshold range is based on the communication range of the antenna of the surveillance node and a communication range of the antenna of the respective surveillance node in the subset.

20. A surveillance network, comprising:

a plurality of surveillance nodes, wherein each surveillance node is defined in claim 17;

wherein the memory and the sequences of instructions of each surveillance node is configured to cause the surveillance node to perform steps a)-g).

* * * * *